United States Patent [19]

Imai et al.

[11] Patent Number: 4,654,483
[45] Date of Patent: Mar. 31, 1987

[54] ELECTRONIC CONFERENCE SYSTEM

[75] Inventors: Ryusaku Imai, Kawasaki; Fujio Sekiguchi, Inagi; Tomoyuki Chou, Atsugi; Nobumasa Ohya; Hitoshi Sato, both of Yokohama, all of Japan

[73] Assignee: Fujitsu Limited, Kawasaki, Japan

[21] Appl. No.: 622,456

[22] Filed: Jun. 20, 1984

[30] Foreign Application Priority Data

| Jun. 28, 1983 | [JP] | Japan | 58-115045 |
| Jun. 28, 1983 | [JP] | Japan | 58-115048 |
| Jun. 29, 1983 | [JP] | Japan | 58-115884 |
| Dec. 30, 1983 | [JP] | Japan | 58-248248 |

[51] Int. Cl.$^4$ .......................................... H04M 11/00
[52] U.S. Cl. ........................................ 379/54; 379/93; 340/365 R
[58] Field of Search ................ 179/2 A, 2 DP, 2 TV, 179/2 TS, 18 BC; 358/85; 364/200 MS File, 900 MS File

[56] References Cited

U.S. PATENT DOCUMENTS

| 4,387,271 | 6/1983 | Artom | 179/2 DP |
| 4,414,621 | 11/1983 | Bown et al. | 364/200 |
| 4,524,244 | 6/1985 | Faggin et al. | 179/2 DP |

OTHER PUBLICATIONS

"Floppy Disk Formatter/Controller MB 8876A, MB8877A", Fujitsu, Mar. 1982, Edition 1.0.
Neil S. Dumas, "Adding Color Graphics to Telephone Conferences", *Army Research, Development & Acquisition Magazine*, vol. 24, No. 5, Sep./Oct. 1983, pp. 30-31.
Higginbotham et al, "Teleconference Systems", vol. 22, No. 9, Feb. 1980, *IBM Technical Disclosure Bulletin*, pp. 3923-3925.

*Primary Examiner*—Keith E. George
*Attorney, Agent, or Firm*—Staas & Halsey

[57] ABSTRACT

An electronic conference system for a remote conference among a plurality of stations, each of the stations comprising an absolute number providing element, for assigning absolute number to an input picture data, an absolute number transmission element for transmitting the absolute number to another station, and a picture data transmitting element for transmitting the picture data only when the other station does not store the number equal to the absolute number, whereby, the same picture data are supervised or coordinated by the same absolute number.

14 Claims, 24 Drawing Figures

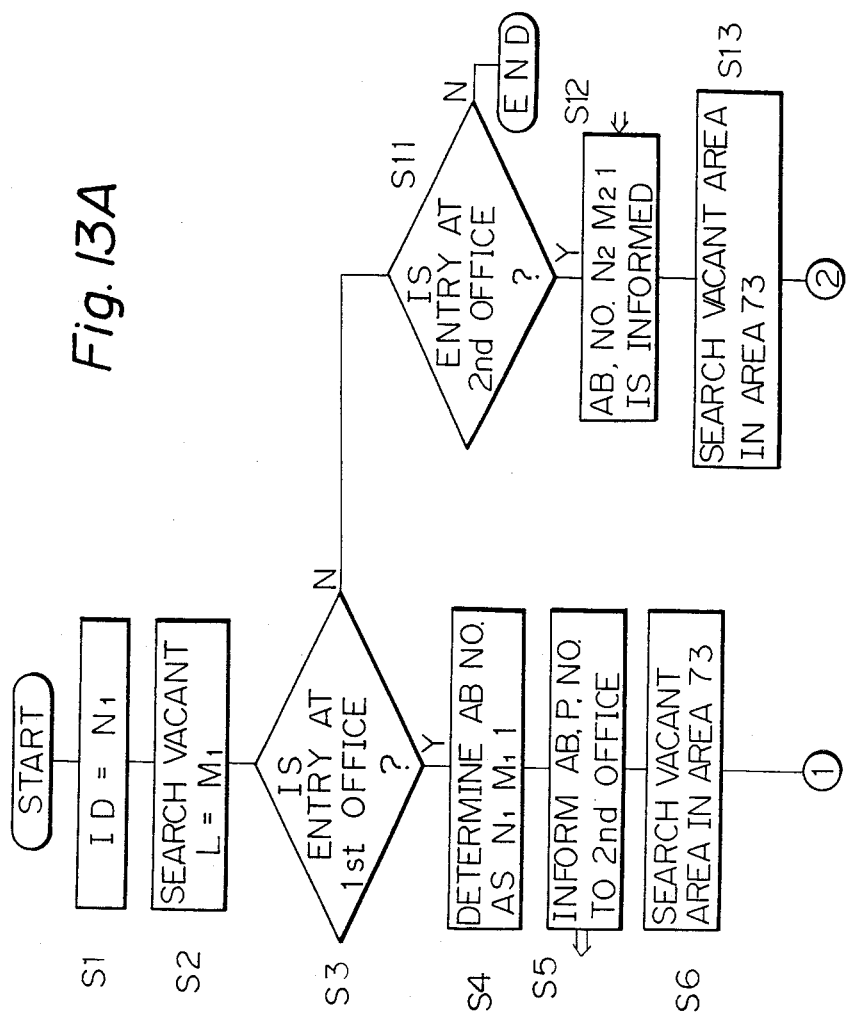

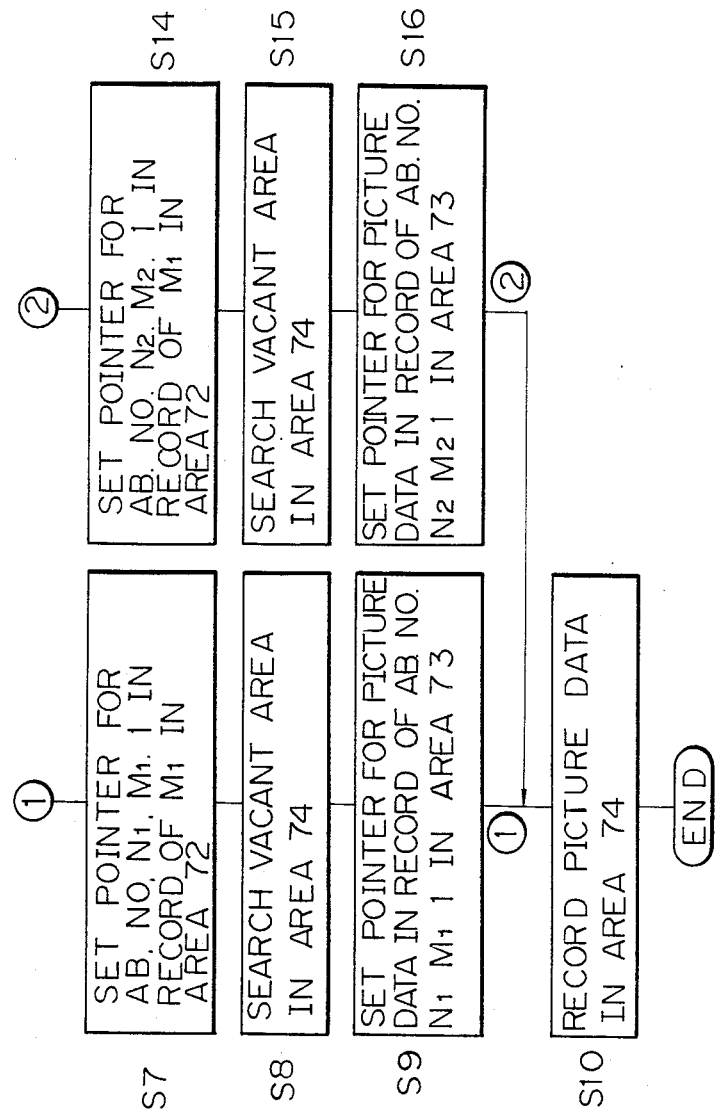

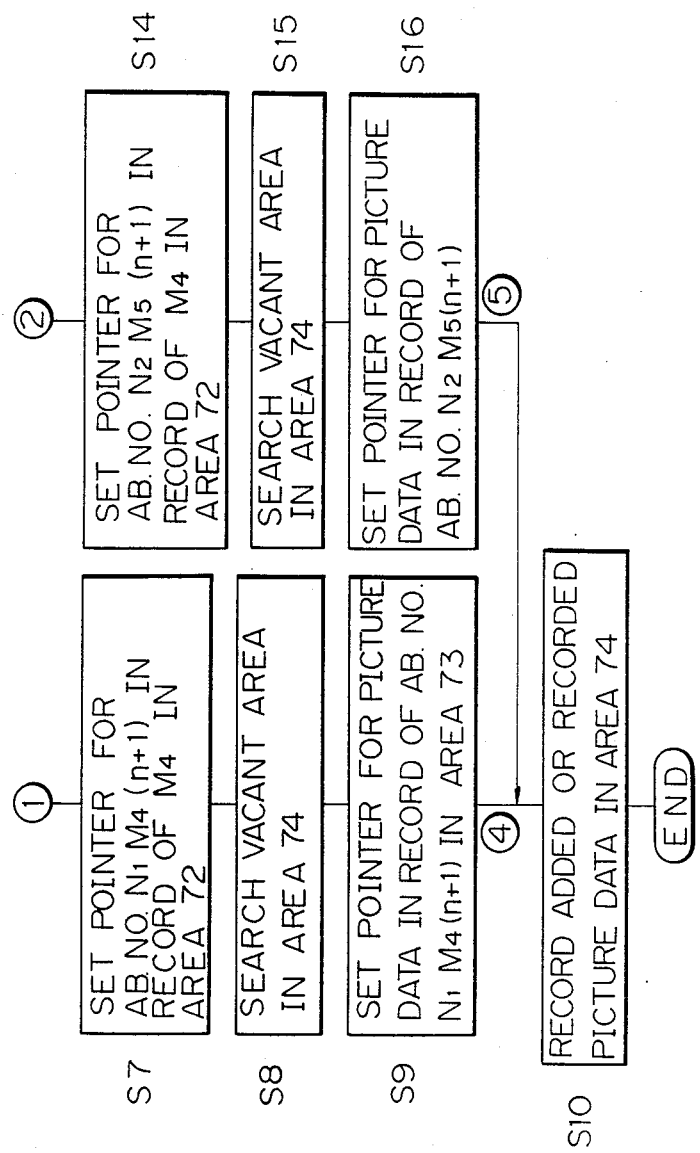

ELECTRONIC CONFERENCE SYSTEM

BACKGROUND OF THE INVENTION (1) Field of the Invention

The present invention relates to an electronic conference system for conducting a remote conference among a plurality of offices, and more particularly, to a remote conference system employing electronic board units, in which the supervision, update and control of picture data are improved.

(2) Description of the Prior Art

In recent years, as a device to allow a conference between conference members remote from each other, an electronic board unit has been developed as an alternative to a conference telephone or a conference integrated television/telephone system.

The conference telephone or the conference integrated television/telephone system achieve their object of enabling a remote conference to be held. However, the conference telephone system can transmit only audio signals and, therefore, has a disadvantage in that it cannot supply the conference members with sketches or other handwritten material during the conference. On the other hand, the conference integrated television/telephone system can pick up handwritten materials and transmit them in the form of visual signals, i.e., pictures, greatly assisting the members of a remote conference. However, to transmit the picked up hand-written materials, the transmission line must have a wide bandwidth. Also, the television camera viewing area at the transmission side that can be picked and transmitted up is relatively small. Therefore, the conference integrated television/telephone system has a disadvantage in that it is difficult to transmit materials written on a wide board. Thus, an electronic board unit, which can transmit the data for material handwritten on a board having a wide area and display the transmitted pictures at a receiving station, has been provided In an electronic conference system employing the electronic board units, material is handwritten, by means of, for example, a felt pen or a marker pen, on an input board, e.g., a tablet or a digitizer, so that the handwritten input data is input and stored at one station or office (hereinafter referred to as a station). The handwritten input data is transferred through a telephone line to a remote station and the received pictures are displayed there on a display unit such as a CRT monitor or a projector. Since the handwritten input data can be transmitted along with audio signals, the use of an electronic board unit is of great assistance to the members of a remote conference.

In the electronic conference system employing the electronic board units, by including color data in the handwritten input data, color pictures also can be displayed on a color picture display unit. In addition, the displayed materials can be recorded as hard copies.

Generally, in a remote conference, the members of the conference each use respective picture display units, during the conference for displaying pictures, which receive picture data from respective storage units (for example, floppy disks). In this case, it is often necessary, in view of the object of the conference, to display the same picture simultaneously on all of the picture display units. The picture data for constructing such a picture is usually previously formed by a member of the conference, and is recorded in the storage unit at his or her station. The picture data is also transferred through transmission lines to the respective picture display units and recorded in their respective storage units. During a conference, it is desired that, when one of the members of the conference designates a common picture number for the picture being displayed on the picture display unit, the same picture can be displayed at the other respective picture display units. When a correction is added to previously formed and/or recorded picture data, a new picture number must be provided and registered. In this situation, it would be desireable to record (duplicate) the same picture data in respective storage units in a plurality of offices remote from each other, and to provide a picture number (an absolute number) common to the respective picture display units to the same picture data. However, such an electronic conference system for use in this case is not known.

In a conventional electronic conference system employing electronic board units, picture data of a picture written at a first station is provided with a picture number which can only be used in that first station. When the picture data formed at the first station is transferred to a second station and stored in the storage unit in the second station, the picture data is, conventionally, provided with another picture number, usually different from the picture number provided at the first station. Therefore, the same picture data has different picture numbers at each respective station. Accordingly, it is difficult to simultaneously display the same picture at different stations. To simultaneously display the same picture at different stations, the picture data of the picture being displayed at the first station is transferred to the other stations. This, however, requires transmission lines with a high transmission capacity or otherwise limits the transmission speed and, as a consequence, the display speed.

Even if a common absolute number is assigned to the same picture data stored in individual storage units of the stations remote from each other, so that the same picture data is commonly controlled in each respective station, a further disadvantage occurs when an addition or a correction is made to an existing picture data which has been numbered with a common absolute number. That is, in this case, the added or corrected picture data has an absolute number different from that of the original picture data. Therefore, when the added and corrected part of the picture data is to be transmitted to a remote station, the entire set of picture data must be transmitted even when the added and corrected part is very small.

This also causes a requirement for transmission lines with a high transmission capacity or again limits the transmission speed.

Further, even when the same picture can be simultaneously displayed at different stations, it is often necessary for a different picture to be displayed at one of the stations.

SUMMARY OF THE INVENTION

Accordingly, an object of the present invention is to provide an electronic conference system for a remote conference among a plurality of stations, in which, when the same picture data is stored in respective storage units of stations remote from each other, the same picture can be simultaneously displayed at the different stations by providing, to the same picture data, an absolute number common to all of the stations, without further transmitting the same picture data from one station to another.

Another object of the present invention is to provide a system such as the above, in which, when a correction or an addition is made to the same picture data at one station, only the corrected or added part of the picture data is transmitted, as a differential or correction data, from one station to another, wherein the corrected or added part of the picture data is added to the same picture data in the other station without retransmitting the entire set of original picture data.

Still another object of the present invention is to provide a system such as the above, in which each of the stations has two modes of operation, i.e., a common mode and an individual mode, which modes are automatically or manually switched over, and, when one station is in the common mode of operation, the same picture as that displayed at the other stations in the common mode is displayed at that station, whereas, when one station is in the individual mode of operation, a picture individually specified at that station is displayed independently from the picture displayed at the other stations in the common mode.

A still further object of the present invention is to improve the coordination supervision and control of the picture data by providing a system such as the above.

A further object of the present invention is to reduce the needed transmission capacity of a transmission line between remote stations by providing a system such as the above.

A further object of the present invention is to increase the data transmission speed by providing a system such as the above.

A further object of the present invention is to provide a system such as the above in which a convenient system for assigning identification numbers to individual storage units is provided.

To attain the above objects, an electronic conference system is provided for a remote conference among a plurality of stations, in which each of the stations has a data input unit for inputting picture data, a storage unit for storing picture data of plural pictures and a display unit for displaying each of the pictures one at a time. Also included is a control unit connected to the data input unit, the storage unit, and the display unit, for controlling the storing of picture data input from the data input unit or transferred from another station, for controlling the display on the display unit, for controlling the transmitting of picture data stored in the storage unit to the other station, and for controlling the receiving of picture data transferred from the other station. In these stations, the control unit includes: absolute number providing means for providing a first absolute number for picture data when the picture data of the picture is input from the data input unit in one of the stations and absolute number transmission means for transmitting the first absolute number to the other station of the stations. Also included in the control units are picture data transmitting means for transmitting the picture data provided with the first absolute number to the other station only when the other station does not have the number equal to the first absolute number and absolute number receiving means for receiving a second absolute number from the other station when picture data is formed in the other station. Further included are discriminating means for discriminating whether or not the storage unit stores the number equal to the second absolute number from the other station and discriminating result transmission means for transmitting the result of the discrimination by the discriminating means to the other station. Picture data receiving means for receiving a picture data is also provided, in the other station, with the second absolute number, the other station being adapted to transmit the picture data with the second absolute number in response to the information received from the discriminating result transmission means, this information indicating that the storage unit has not stored the number equal to the second absolute number; so that, the same picture data of the same pictures stored in respective storage units in respective stations is supervised or coordinated by the same absolute number at connected stations.

The control unit in the station further includes a write control means for writing an absolute number, provided in the station or transferred from the other station, into the storage unit in the station, absolute number specifying means for specifying an absolute number corresponding to a picture to be displayed, and read control means for reading picture data of a picture to be displayed, by searching using an address of the picture data in the storage unit, this address corresponding to the absolute number specified by the absolute number specifying means.

The storage unit in each of the stations includes a first area for storing the absolute numbers and a second area for storing the picture data of the plural pictures corresponding to the absolute numbers in a one by one correspondence. Each of the absolute numbers includes a first number for indentifying a storage unit in which the absolute number is originally stored, and a second number for specifying the address in the storage unit of picture data of a picture to be displayed.

Each of the absolute numbers further includes a third number, the third number representing the number of additions to the picture corresponding to the absolute number including the third number. When an addition is made, by means of the data input unit, to a picture being displayed at the first station, the absolute number providing means forms a new absolute number corresponding to the added part of the new picture data. The absolute number transmission means transmits the new absolute number to the second station, and the picture data transmitting means transmits the added part of the new picture data to the other station.

The electronic conference system further includes switching means for switching the operation of the first station between a common mode of operation for displaying, in the station, a picture which is the same as the picture displayed in the another station when the other station is in the common mode of operation, and an individual mode of operation for displaying, in the station, a picture corresponding to an absolute number specified, independently from the other station, by the absolute number specifying means in the station.

The storage unit stores a plurality of location numbers, each of the absolute numbers stored in the storage unit corresponding to one of the location numbers, and, by specifying a desired one of the location numbers in the absolute number specifying means, a desired picture is displayed.

The storage unit stores a plurality of location numbers, each of the location numbers corresponding to one group of absolute numbers having the same first and, second numbers and different third numbers, and by specifying a desired one of the location numbers in the absolute number specifying means, a desired picture including additions or corrections is displayed.

The electronic conference system also includes first number determining means for determining the first number for identifying a storage unit, including initialization means for initializing the storage unit, the first number being determined based on the time necessary for the initialization.

The first number is determined based on a predetermined lower bits obtained from the time necessary for the initialization.

BRIEF DESCRIPTION OF THE DRAWINGS

The above objects, features, and advantages of the present invention will be more apparent from the following description of the preferred embodiments with reference to the accompanying drawings, in which:

FIGS. 13A and 13B together form a flowchart illustrating a sequence of processes when a new picture data is formed according to an embodiment of the present invention;

FIGS. 16A and 16B together form a flowchart illustrating a sequence of processes when an addition or correction is effected on an existing picture data.

FIG. 20 is a table showing the contents of the absolute number/supervising memory in the unit shown in FIG. 19.

DESCRIPTION OF THE PREFERRED EMBODIMENTS

Before describing the preferred embodiments of the present invention, the fundamental functions of a remote conference system according to the present invention will be described with reference to FIGS. 1 through 9.

Figure 1:
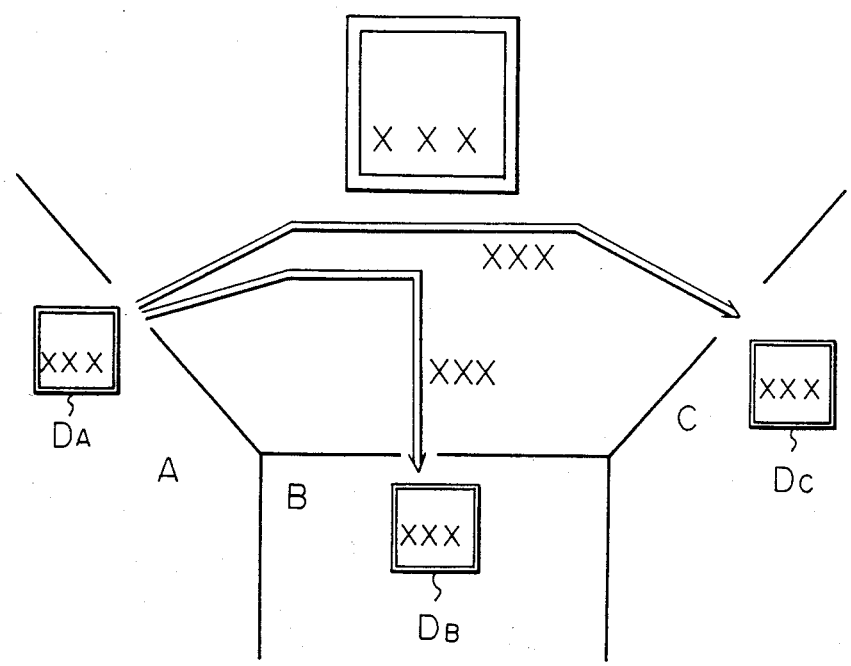
FIG. 1 is a schematic block diagram of a picture data transfer in an electronic conference system according to the present invention.

FIG. 1 is a schematic block diagram of picture data transmission in an electronic conference system according to the present invention. In FIG. 1, three offices or, in other words, stations A, B, and C remote from each other are illustrated. All of the stations are provided with display units $D_A$, $D_B$, and $D_C$, respectively displaying the same picture, illustrated by a symbol XXX. After the picture XXX is originally formed in station A, station A transmits the picture data of the picture XXX to stations B and C. Stations B and C then display on their display units $D_B$ and $D_C$ the same picture XXX. This is the basic and fundamental function needed for carrying out a remote conference, and is achieved according to the present invention as described later in more detail.

Figure 2:
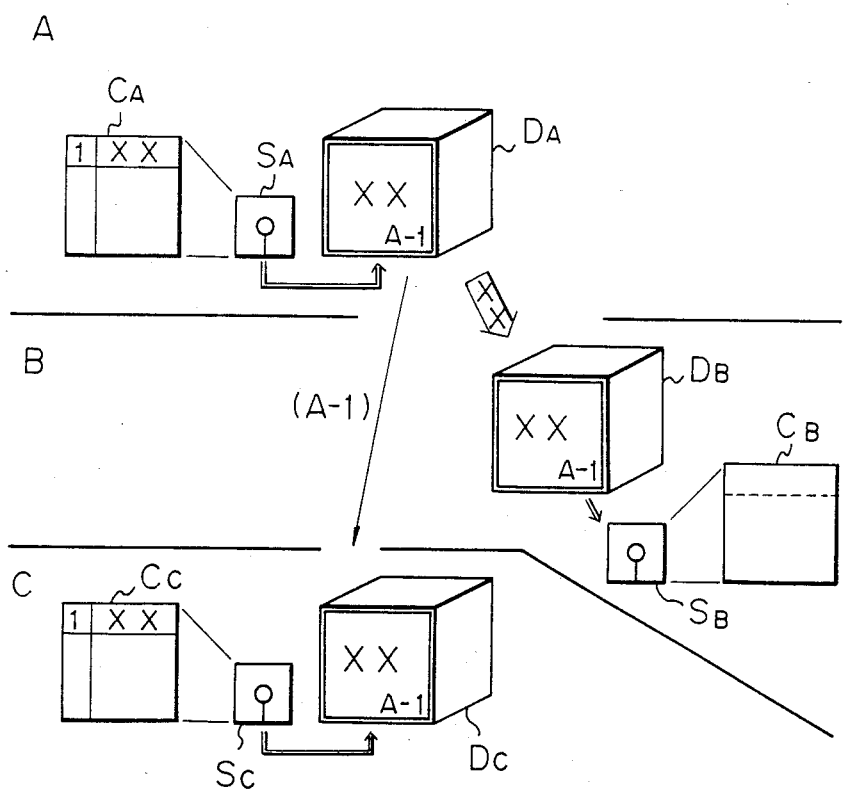
FIG. 2 is a schematic block diagram of an absolute number transfer in an electronic conference system according to the present invention.

FIG. 2 is a schematic block diagram of an absolute number transfer in an electronic conference system according to the present invention. In FIG. 2, the three remote stations A, B, and C have storage units $S_A$, $S_B$, and $S_C$ in addition to the display units $D_A$, $D_B$, and $D_C$. The storage units $S_A$, $S_B$, $S_C$ are, for example, floppy disks. The data stored in these storage units $S_A$, $S_B$, and $S_C$ are as indicated by reference symbols $C_A$, $C_B$, and $C_C$, respectively. In station A, the storage unit $S_A$ stores picture data for a picture illustrated by a symbol XX. In station C, the storage unit $S_C$ also stores the picture data for the same picture as that illustrated by the symbol XX. However, in station B, the storage unit $S_B$ does not at first store the same picture data of the picture XX. The picture data of the picture XX in each of the stations A and C is provided with an absolute number A-1. The absolute number is a page identification number associated with a particular page at all times and throughout the conference network. When the theme of the conference relates to the picture XX, and the picture XX is to be displayed at all of the stations, station A transmits the absolute number A-1 to stations B and C. Station C can identify that it has the same absolute number as the absolute number A-1 transmitted from station A. However, station B does not have the absolute number A-1 and informs station A that station B does not have the absolute number A-1. Station A then transmits the picture data of the picture XX only to station B, which then displays, based on the transmitted picture data from station A, the picture XX on its display unit $D_B$. Station C displays the picture XX on its display unit $D_C$, based on the picture data from its storage unit $S_C$. Thus, by labelling the picture data with an absolute number common to all of the stations, the picture data need not be transferred to the other station when it has the same absolute number as the number transmitted from the other station.

Figure 3:
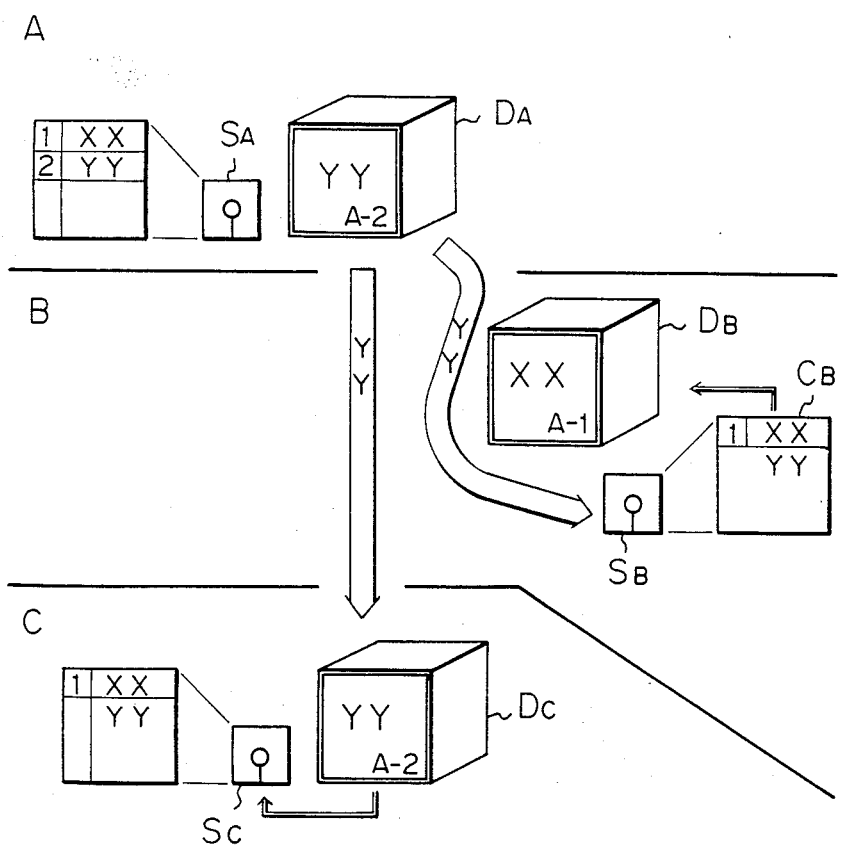
FIG. 3 is a schematic block diagram of an individual mode of operation in an electronic conference system according to the present invention.

FIG. 3 is a schematic block diagram of an individual mode of operation in the electronic conference system according to the present invention. In FIG. 2, the next main theme of the conference relates to a picture YY, the picture data of which is labelled with an absolute number A-2. The picture data of the picture YY, in this case, is stored only in the location number 2 of the storage unit $S_A$. The display unit $D_A$ displays the picture YY based on the picture data in the storage unit $S_A$. Station A transmits the picture data of the picture YY to stations B and C. In station C, the picture data transmitted from station A is input into the display unit $D_C$ and the picture YY is displayed thereon. Also, the picture data is input to the storage unit $S_C$ and is stored therein. However, in station B, the picture data transmitted from station A is input only to the storage unit $S_B$, and is stored therein. The display unit $D_B$ displays the picture XX labeled with the absolute number A-1 and does not display the picture YY labeled with the absolute number A-2. That is, in this case, station B selects an individual mode of operation, and station C selects a common mode of operation. Since the storage unit $S_B$ in station B now stores the picture data of the picture YY, the contents of the storage unit $S_B$ coincide with the progress of the conference. Thus, any one of the stations can select an individual mode in which any desired picture stored in its storage unit can be specified to be displayed, or a common mode in which a picture common to all of the stations is displayed.

Figure 4A:
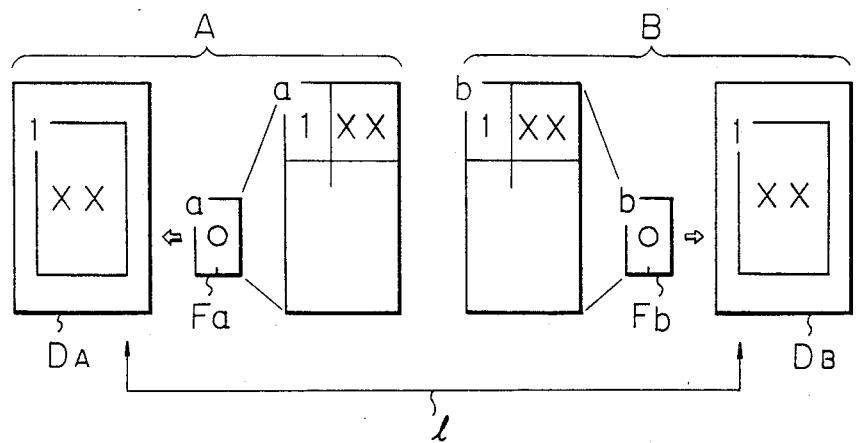
FIGS. 4A and 4B are schematic block diagrams of a conventional electronic conference system, to explain the problems therein.
Figure 4B:
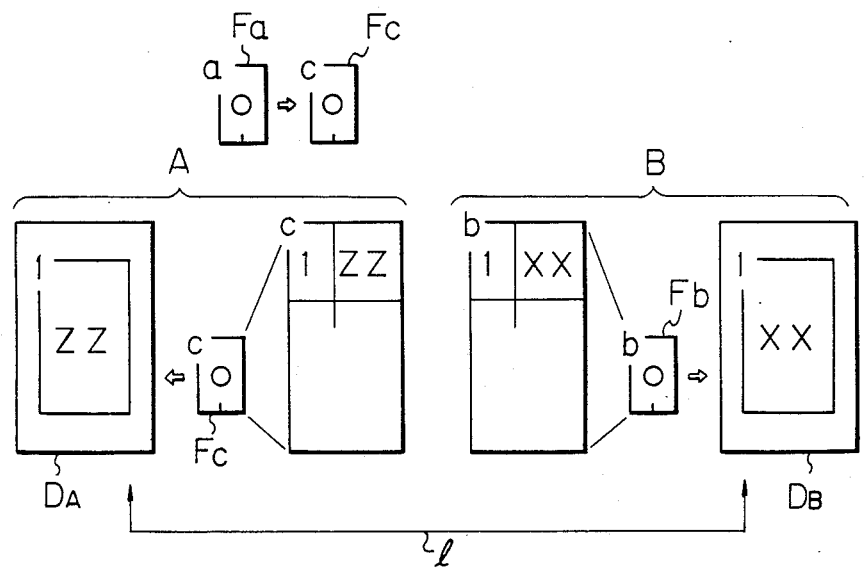

FIGS. 4A and 4B are schematic block diagrams of a conventional electronic conference system, to explain the problems therein. In the prior art, no absolute number is labeled is provided for the picture data of one picture. Only a number of contents, or a location number in the storage unit, is provided for each set of the picture data. The numbers of contents, i.e., the location numbers, are sequentially provided in each of the storage units. In FIG. 4A, stations A and B are associated by a communication line 1. Station A includes a display unit $D_A$ and a floppy disk $F_a$. Station B includes a display unit $D_B$ and a floppy disk $F_b$. The floppy disk $F_a$ stores picture data for a picture XX in the location number "1". The floppy disk $F_b$ stores the same picture data for the picture XX as above in its location number "1". In this state, by designating the location number "1" at both station A and B, the same picture XX is displayed on both the display units $D_A$ and $D_B$. However, assume that the floppy disk $F_a$ is replaced by another floppy disk $F_c$, as illustrated in FIG. 4B, the display unit $D_A$ then may display another picture ZZ different from the original picture XX. Because, in this case, the floppy disk stores, in its location number "1", the picture data of the picture ZZ. Thus, in the prior art, even when the same content number is designated at different stations, the displayed pictures are not necessarily the same.

Figure 5A:
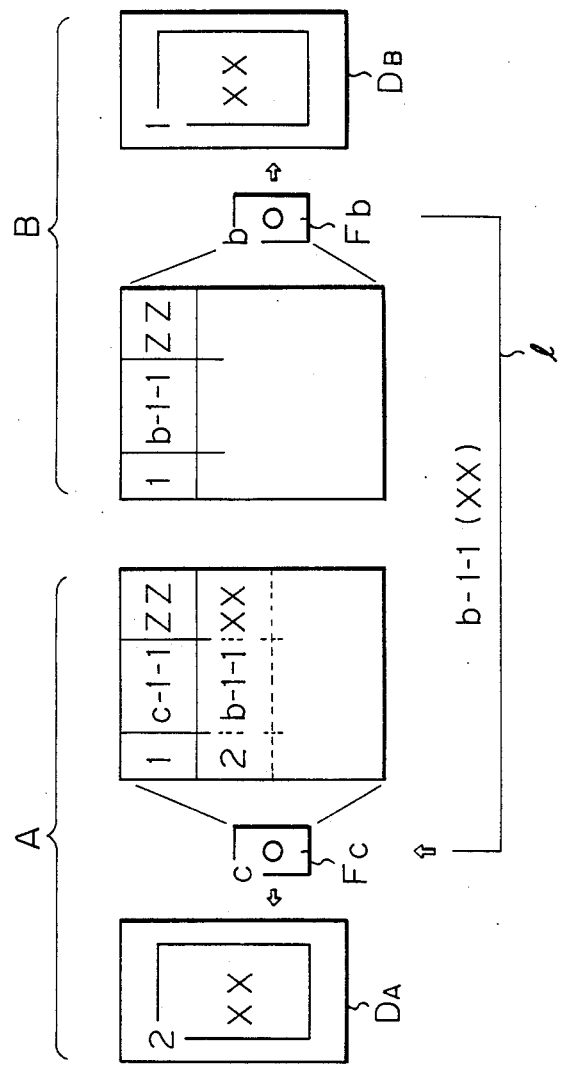
FIGS. 5A and 5B are schematic block diagrams of an electronic conference system according to the present invention, in which two stations have or do not have common picture data provided with a common absolute number.
Figure 5B:
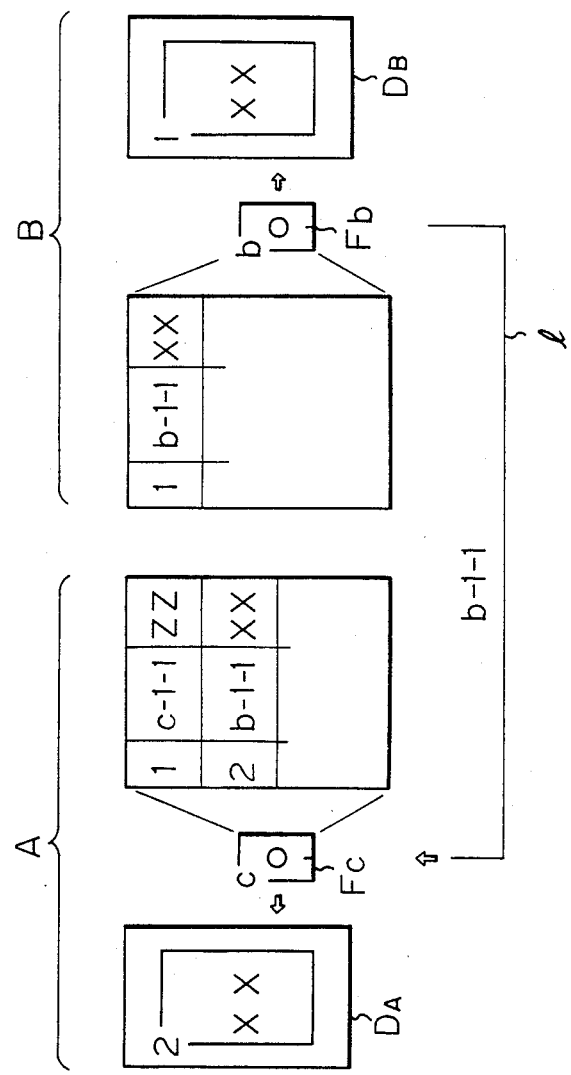

FIGS. 5A and 5B are schematic block diagrams of an electronic conference system according to the present invention, in which two stations have or do not have common picture data provided with a common absolute number. According to the present invention, each set of picture data for one picture is labeled with an absolute number, e.g., b-1-1 or c-1-1. As illustrated, each of the absolute numbers consists of three symbols, i.e., a first symbol such as b or c, a second symbol following the first symbol, in FIGS. 5A and 5B, equal to "1", and a third symbol following the second symbol, in FIGS. 5A and 5B, is equal to "1". The first symbol identifies a floppy disk in which the corresponding picture data is originally formed and stored; the second symbol indicates a content number in the identified floppy disk; and the third symbol indicates the number of corrections effected on the original picture data. The third symbol thus may be referred to as an editing symbol.

In FIG. 5A, the only difference from FIG. 4B is that each set of picture data stored in respective storage units $F_B$ and $F_C$ is labelled with an absolute number consisting of three symbols. In operation, the picture data for the picture XX is formed first in station B and is stored in the floppy disk $F_b$ with the absolute number b-1-1. The first symbol "b" indicates that this picture data is originally stored in the floppy disk $F_b$. The second symbol "1" indicates that this picture data is stored in the location "1" in the floppy disk $F_b$. The third symbol "1" indicates that this picture data is the first addition, or no correction has been made to this picture data. By specifying the second symbol on a keyboard (not shown) in station B, the picture data with the absolute number b-1-1 is input to the display unit $D_B$ and the picture XX is displayed thereon. The absolute number b-1-1 is also transmitted through the transmission line 1 to station A. In station A, a search is conducted for the absolute number equal to the number b-1-1 transmitted from station B. If the same absolute number is not found in the floppy disk $F_c$, as in the case of FIG. 5A, then station B transfers the picture data corresponding to the absolute number b-1-1 to station A. Station A displays the picture based on the picture data transmitted from station B, and, simultaneously, stores the picture data with the corresponding absolute number b-1-1 into an appropriate vacant location (in FIG. 5A, into location number 2) in the storage unit $F_c$.

If the floppy disk $F_c$ has already stored therein the picture data with the absolute number b-1-1, as shown in FIG. 5B, the absolute number equal to the number b-1-1 transmitted from station B is found. In this case, station A informs station B that station A has the picture data with the absolute number b-1-1. Station B then, in response to the information from station A, does not transmit the picture data.

In FIGS. 5A and 5B, the third symbol in the absolute number is not used. The effective use of the third symbol is described with reference to FIGS. 6 and 7.

Figure 6:
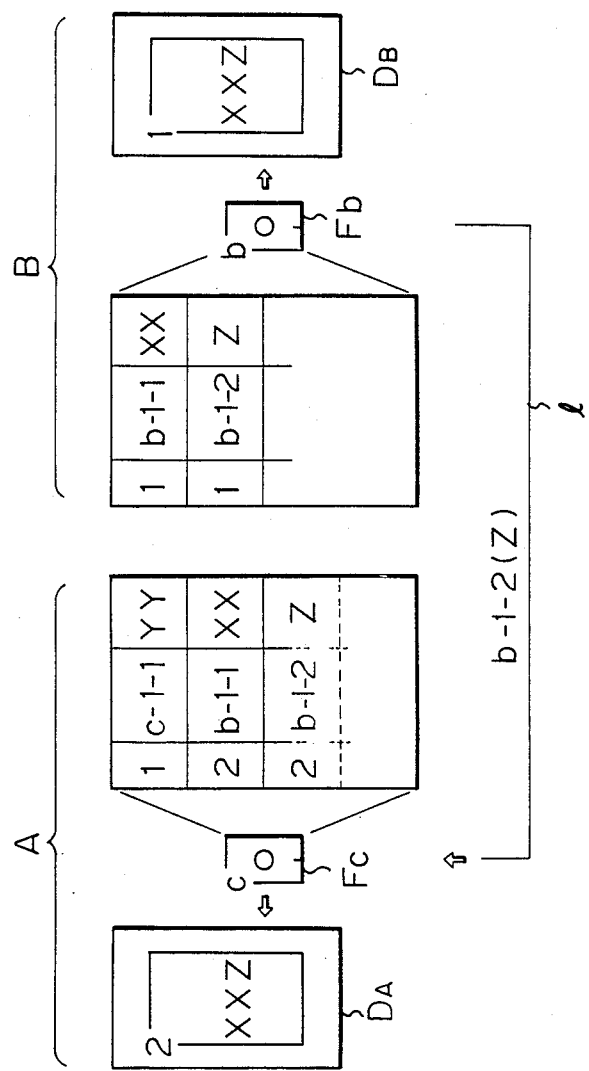
FIG. 6 is a schematic block diagram of an electronic conference system according to the present invention, in which only an added part of picture data is transferred from one station to another.

FIG. 6 is a schematic block diagram of an electronic conference system according to the present invention, in which only added picture data is transmitted from one station to another. In FIG. 6, the floppy disk $F_c$ in station A previously stores the picture data with the absolute number c-1-1 and the picture data with the absolute number b-1-1. The floppy disk $F_b$ in station B previously stores the picture data with the absolute number b-1-1. Initially, the picture XX is displayed on both the display units $D_A$ and $D_B$ based on the picture data with the absolute number b-1-1 stored in the floppy disks $F_c$ and $F_b$.

In this state, assume that a new picture Z must be added to the displayed picture XX in, for example, station B. Picture data of the picture Z is then formed in station B and is stored with a new absolute number b-1-2 in a vacant area in the area of the location number "1" for the original absolute number b-1-1 in the floppy disk $F_b$. Note that, to express that the new picture is the part added to the original picture XX, the third symbol of the new picture data is revised to "2", and the first and the second symbols "b" and "1" remain as originally designated. The added part of the picture data with the absolute number b-1-2 is then transmitted to station A. In station A, when the added part of the picture data is received, it is stored in a vacant area in the area of the location number "2" with the original absolute number b-1-1 in the floppy disk $F_c$. Thus, by designating the absolute numbers b-1-1 and b-1-2, a revised picture XXZ is displayed on both the display units $D_A$ and $D_B$. The absolute numbers b-1-1 and b-1-2 can be designated by specifying the location number "1" in station B or the location number "2" in station A.

Figure 7:
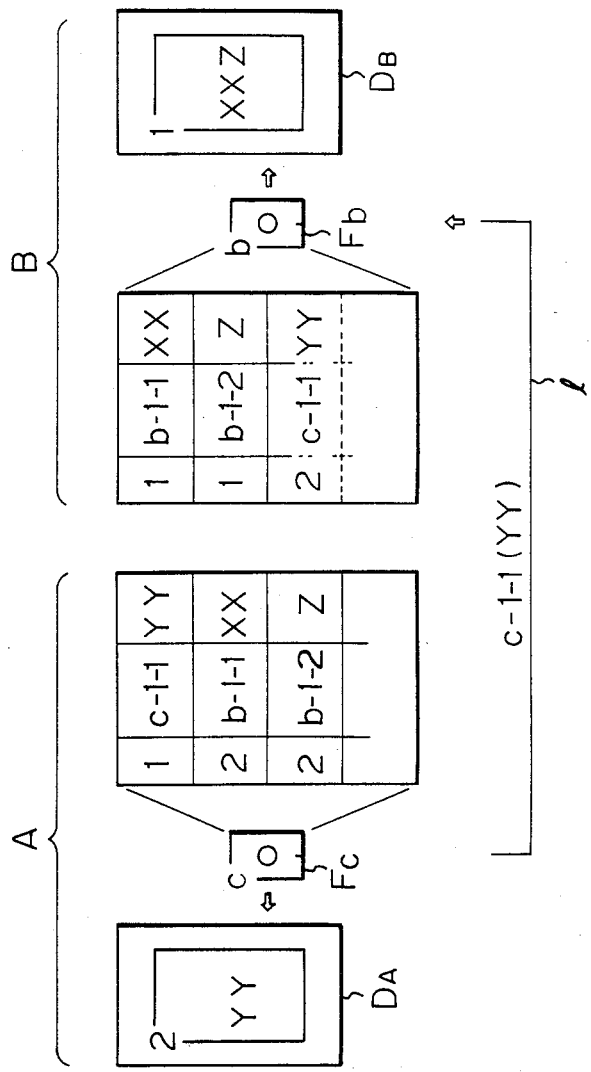
FIG. 7 is a schematic block diagram of an electronic conference system according to the present invention, in which one station is in the individual mode of operation.

FIG. 7 is a schematic block diagram of an electronic conference system in which one station is under the individual mode of operation. In FIG. 7, the stored contents of the floppy disks $F_c$ and $F_b$ are initially the same as the stored contents of the final stage of the floppy disks $F_c$ and $F_b$, as illustrated in FIG. 6. That is, the floppy disk $F_c$ previously stores the picture data with the absolute numbers c-1-1, b-1-1, and b-1-2. Also, the floppy disk $F_b$ previously stores the picture data with the absolute numbers b-1-1 and b-1-2.

In this state, when the theme of the conference is changed so that the picture YY must be displayed, the display unit $D_A$ fetches the picture data with the absolute number c-1-1 and displays the picture YY. Further, the picture data with the absolute number c-1-1 is transferred to station B and is stored in an area of a location number 2, for example, of the floppy disk $F_b$. Station B, however, selects the individual mode of operation requiring that the picture XXZ being displayed should be maintained on the display unit $D_B$. Thus, even when the new picture data with the absolute number c-1-1 is transmitted from station A, the picture YY is not displayed in station B under the individual mode of operation. The picture data with the absolute number c-1-1 is merely stored in the floppy disk $F_b$.

Embodiments of the present invention will now be described in detail in the following.

Figure 8:
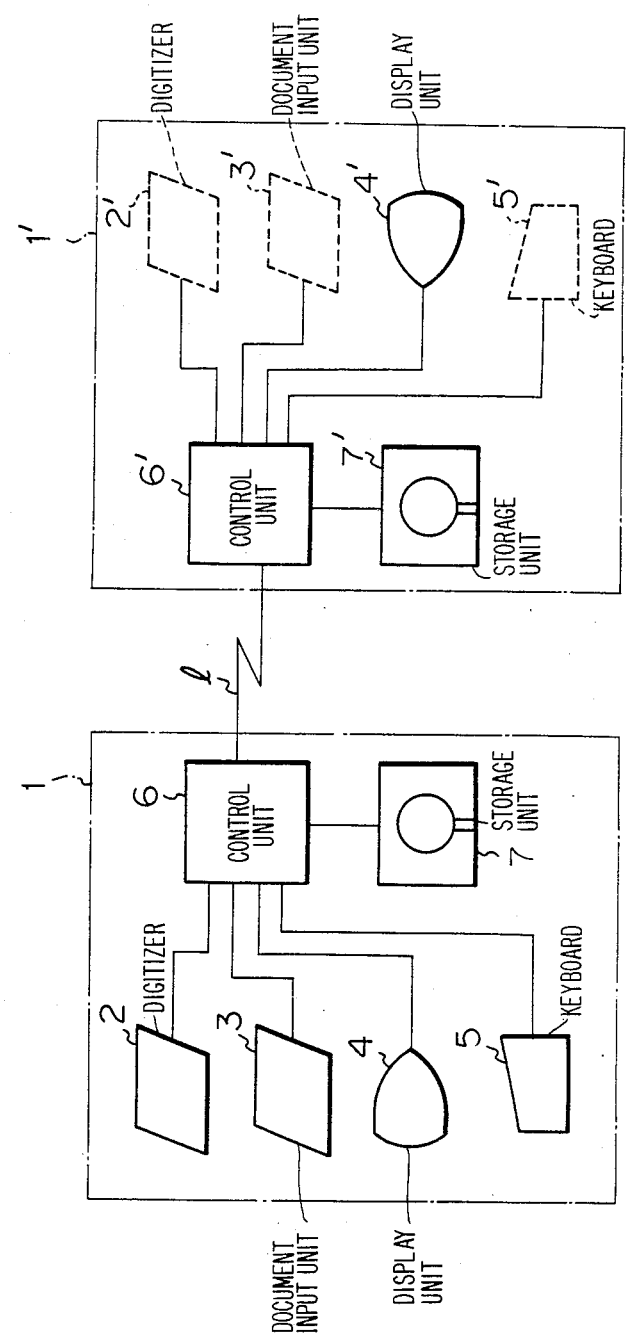
FIG. 8 is a block diagram illustrating the general composition of an electronic conference system according to the present invention.

FIG. 8 illustrates the general construction of an electronic conference system according to the present invention. In FIG. 8, a first station 1 on one side is connected through a communication line l such as a telephone line, etc., to a second station 1'. The first station 1 is provided with a digitizer unit 2 for inputting handwritten data, a document input unit 3, which is a scanner unit for inputting existing documents, a display unit 4 such as a CRT monitor or a projector for displaying the handwritten data or the documents, a keyboard unit 5 for inputting operating instructions, etc., a control unit 6, and a storage unit 7, such as a floppy magnetic disk unit for filing or storing picture data. The digitizer unit 2 is provided with a tablet i.e., an electronic board.

In operation, assume that picture data X is first formed in the first station 1 by an input from the digitizer unit 2 or the document unit 3. Then, an absolute number F is assigned to the picture data X, as described in detail later. The picture data X and its absolute number F are stored in a location number n in the storage unit 7. As described before, the absolute number F consists of three symbols, i.e., the first symbol for identifying the storage unit 7 in which the picture data is first stored, the second symbol indicating the location of the stored picture data in the storage unit 7, and the third symbol indicating the number of corrections made to the original picture data X. Therefore, the location number n of the storage unit 7, into which the picture data is first stored, is the same as the second symbol.

Figures 9, 12:
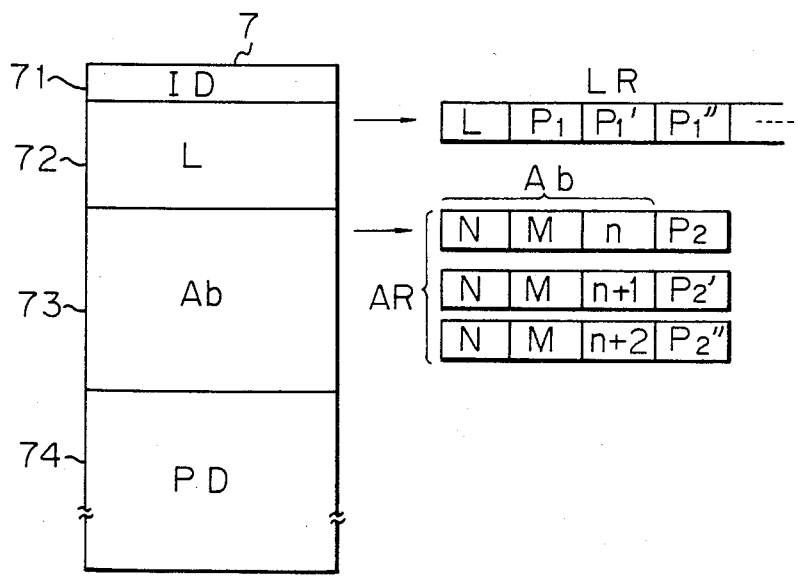
FIG. 9 is a table illustrating the relationship between the location number in a storage unit, the absolute number, and the picture data.
FIG. 12 is a diagram of the structure of the storage unit according to an embodiment of the present invention.

FIG. 9 is a table illustrating the relationship between the location number L, the absolute number Ab, and the picture data PD. As shown in FIG. 9, the area of the location number 1 stores an absolute number $F_a$ and its corresponding picture data A; the area of the location number 2 stores an absolute number $F_b$ and its corresponding picture data B; the area of the location number n stores the absolute number F and its corresponding picture data X; and so forth. The location numbers 1, 2, ..., n, ... are sequentially assigned in accordance with the sequence of the formation of the picture data.

Referring back to FIG. 8, to simultaneously display the picture for the picture data X on both the display units 4 and 4', an operator inputs, by means of the keyboard unit 5, the second number n which is, in the station where the picture data X is originally formed, the same as the location number n. In response to the input in the keyboard 5, the control unit 6 reads the picture data X and its corresponding absolute number F. The picture data X is then input into the display unit 7, which then displays the picture for the picture data X. The control unit 6 simultaneously transmits the absolute number F through a communication line l to the second station 1'. The second station 1' then searches its storage unit 7' for the number equal to the absolute number F.

If the absolute number F is found in the storage unit 7', the control unit 6' in the second station 1' informs the control unit 6 in the first station that the storage unit 6' has already stored the absolute number F. In this case, the storage unit 6' reads the picture data X corresponding to the absolute number F and inputs it to the display unit 4'. Thus, the same picture of the picture data X is displayed on both the display units 4 and 4'.

If the absolute number F is not found in the storage unit 7', the control unit 6' informs the control unit 6 that the storage unit 6' has not stored the absolute number F. In this case, the control unit 6 automatically transmits the picture data X corresponding to the absolute number F to the control unit 6'. The control unit 6' then assigns the absolute number F to the picture data X and stores the assigned absolute number F and the transmitted picture data X in the storage unit 7', and also displays the picture for the picture data on the display unit 4'. Thus, the same picture for the picture data X is displayed on both the display units 4 and 4'. By previously establishing a relationship between a location number n' in the storage unit 7' and the absolute number F, an operator at the second station 1' can designate the picture for the picture data X to be displayed on both the display units by inputting the number n' from the keyboard unit 5'.

Thus, the picture data having the common absolute picture number F is simultaneously displayed on the display units 4 and 4' by means of the control units 6 and 6'.

Also, in the electronic conference system shown in FIG. 8, during the display of the picture stored in the storage units 7 and 7', additions or corrections can be carried out to the picture being displayed by means of the digitizer unit 2 or 2'. In this case, the original picture a is defined to have an absolute picture number X having a third number 1. The added or corrected part of the picture is assumed to be designated as b. The new picture is then given as a+b. The absolute number for the picture b is given as X' and is stored in the storage unit 7 or 7' in the station at which the additions or corrections to the original picture a are carried out. In the new absolute number, the first and the second numbers are respectively equal to those in the original absolute numnber. The third number, i.e., 2, in the new absolute number X', however, is different from the third number; i.e., 1, in the original absolute number.

When additions or corrections are made to an existing picture at the first station 1, this results in the second station 1' not having the picture data provided with the new absolute number X'. When the second station 1' requires a transfer of the picture data provided with the new absolute number X', only the picture data for the picture b which is the added or corrected part, is transmitted. Since the amount of picture data for the picture b is generally quite small, compared with the original picture data for the picture a, the transmission efficiency is very high in comparison with that when the new picture data for the picture (a+b) is transferred.

Figure 10:
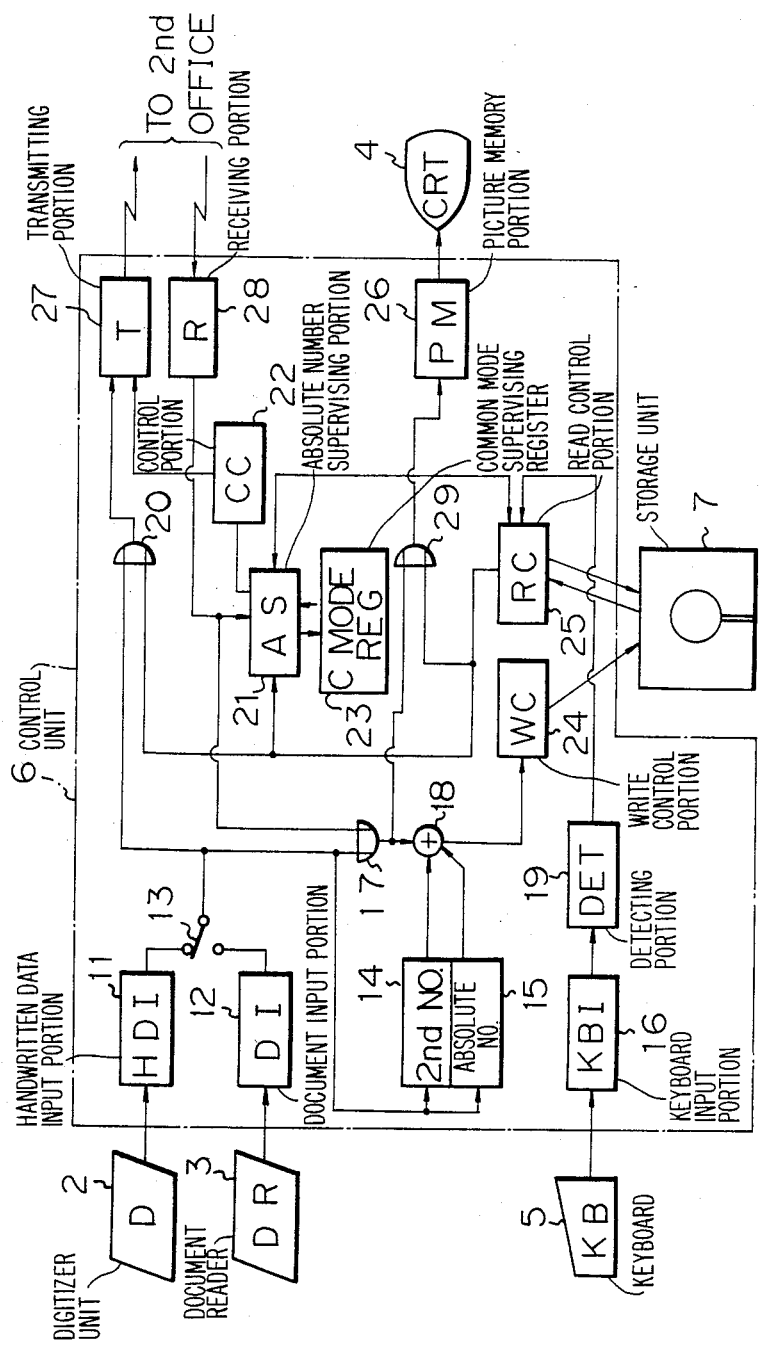
FIG. 10 is a block diagram illustrating an embodiment of the control unit in the system shown in FIG. 8.

FIG. 10 is a more detailed diagram of the control unit 6 according to an embodiment of the present invention. In the control unit 6 shown in FIG. 10, a handwritten data input portion (HDI)11 controls the input data from the digitizer unit (D)2 so that the data for the coordinates input from the digitizer unit 2 is edited into a packet having a constant length. Also, the input data is converted into a differential vector code as a communication data to be transmitted to the second station 1', and is transferred through a switch 13 and an OR gate 20 to a transmitting portion (T)27.

A document input portion (DI)12 controls the input from the document reader (DR)3.

A second number numbering portion 14 forms a second number indicating the location of picture data to be stored in the storage unit 7.

An absolute number numbering portion 15 forms an absolute number for a picture to be stored in the storage unit 7. When the absolute number is determined, the second number is also determined because the absolute number includes the second number.

A number adding portion 18 assigns new picture data the absolute number and the second number from the numbering portions 14 and 15. The new picture data is formed by the digitizer unit 2 or the document reader 3, or is transmitted from the second station 1' through a receiving portion 28 and an OR gate 17.

A keyboard input portion 16 discriminates data input through function keys or ten numeric keys on the keyboard unit 5.

A number detecting portion (DET)19 converts data, input from function keys such as "preceding page", "next page", etc., on the keyboard unit 5, into a number for specifying picture data of a picture to be displayed. The number specified by the keyboard unit 5 is then supplied to a read control portion (RC)25.

The read control portion 25 accesses the storage unit 7 to read an absolute number and its corresponding picture data.

An absolute number supervising portion (AS)21 supervises absolute numbers when the first station 1 is under a common mode of operation. That is, in a common mode of operation, the abolute number supervising portion 21 writes a common absolute number, which is read from the storage unit 7 by means of the read control unit 25, into a common mode supervising register 23. The absolute number stored in the common mode supervising register 23 is then transmitted to the second station 1'. Also, in a common mode of operation, when an absolute number is transmitted from the second station 1', the absolute number supervising portion 21 discriminates whether or not the storage unit 7 stores the number equal to the absolute number from the second station 1'.

A write control portion 24 writes picture data and its absolute number into a picture data area and an index area, respectively, in the storage unit 7.

The read control portion 25 searches the addresses in the picture data area in the storage unit 7, for the address corresponding to the second number input from the keyboard unit 5 or to the absolute number transmitted from the second station 1' through a receiving portion 28 and the absolute number supervising portion 21. When the address is found, the read control portion 25 reads the picture data, which is then transferred through an OR gate 29 to a picture memory portion 26 and through an OR gate 20 to a transmitting portion 27. The picture memory portion 26 develops the input picture data and converts it into video signals. The video signals are then supplied to the display unit, such as a CRT monitor.

The operation of the control unit 6 shown in FIG. 2 is described in more detail in the following. Note, each portion in the control circuit 6' at the second station 1' is represented in the specification by the number of the corresponding portion in FIG. 10 plus an apostrophe, e.g., DR 3'.

The data from the handwritten data input portion 11 or the document input portion 12 are transferred through the switch 13, the OR gate 17, and the number adding portion 18, to the write control portion 24, and are stored in the storage unit 7 by means of the write control portion 24. The output of the OR gate 17 is also stored through the OR gate 29 into the picture memory portion 26, and is displayed on the display unit 4. Further, the output of the switch 13 is input through the OR gate 20 into the transmitting portion 27 from which the output is transmitted to the second station 1'. In this case, the second number n and the absolute number F are provided by the second number numbering portion 14 and the absolute number numbering portion 15 respectively, and are added to the picture data by means of the number adding portion 18. The picture data provided with the absolute number F including the second number n is stored in the storage unit 7. The absolute number F consists of a first number for identifying the storage unit 7, a second number indicating a location number in the identified storage unit, and a third number indicating the number of corrections.

In response to a "picture display requirement" command given by designating a number n from the keyboard unit 5, the absolute number F including the second number n is read from the storage unit 7 through a route comprising the keyboard input portion 16, the number detecting portion 19, the read control portion 25, and the storage unit 7. The picture data corresponding to the absolute number F is also read from the storage unit 7 by the read control portion 25. The read picture data is transferred through the OR gate 29 into the picture memory portion 26. Thus, the picture corresponding to the absolute number F is displayed on the display unit 4.

Alternatively, the picture may be displayed on the display unit 4 after the first station 1 receives, from the second station 1', information on whether or not the second station 1' has the number equal to the absolute number F, as described later in detail. This latter display operation is advantageous over the former because the display is effected almost simultaneously on both the display units 4 and 4', since the display occurs after a search operation for the absolute number F in the second station 1'. Therefore, in the following, the latter displaying operation is described.

On the other hand, the read absolute number F is transmitted from the read control unit 25 to the second station 1' through a route comprising the OR gate 20 and the transmitting portion 27. At the second station 1', the received absolute number F is set in a common mode supervising register 23' through a receiving portion 28' and an absolute number supervising portion 21'; and the picture data corresponding to the absolute number F is searched for through a route comprising an absolute number supervising portion 21', a read control portion 25', and a storage unit 7'.

When the picture data corresponding to the absolute number F is present in the storage unit 7' at the second station, the first station 1 is informed that the storage unit 7' has stored the absolute number equal to the number F, through a route comprising the absolute number supervising portion 21', a communication response control portion 22', and a transmitting portion 27'; and, simultaneously, the picture of the found picture data is displayed on a display unit 4' through a route comprising the storage unit 7', the read control portion 25', an OR gate 29', and a picture memory portion 26'. While at the first station, when the information concerning the presence of this picture data is received at the receiving portion 28, the picture data is accessed in the case of the above mentioned latter displaying operation, through a route comprising the absolute number supervising portion 21, the read control portion 25, and the storage unit 7; and the picture is displayed on the display unit 4 through a route comprising the storage unit 7, the read control portion 25, the OR gate 29, and the picture memory portion 26.

When the picture data corresponding to the absolute number F is not present in the storage unit 7' at the second station 1', the first station 1 is informed that the storage unit 7' has not stored the picture data provided with the absolute number F, through a route comprising the absolute number supervising portion 21', the communication response control portion 22', and the transmitting portion 27'. The first station 1, which has received the information, requests the picture data provided with the absolute number F through a route comprising the receiving portion 28, the absolute number supervising portion 21, the read control portion 25, and the storage unit 7; and the read picture data is transmitted to the second office 1' through a route comprising the storage unit 7, the read control portion 25, the OR gate 20, and the transmitting portion 27. Simultaneously, in the above mentioned latter display operation, the picture data read from the storage unit 7 is transferred through the read control portion 25 and the OR gate 29 to the picture memory portion 26. Thus, the picture corresponding to the absolute number F is displayed on the display unit 4.

At the second station 1', the already received absolute number F is stored in a vacant location in the index area of the storage unit 7'. Also, the picture data transmitted from the first station 1 is stored into the picture data area in the storage unit 7' through a route comprising the receiving portion 28', the OR gate 17', the number adding portion 18', and the write control portion 24'. Simultaneously, the picture of the picture data is displayed on the display unit 4' through a route comprising the receiving portion 28', the OR gates 17' and 29', and the picture memory portion 26'. Thus, the same picture can be displayed on both the display units 4 and 4' when remote from each other.

Now, a transmission of an added or corrected part of the picture data is described.

When the absolute number F is transmitted from the first station 1 to the second station 1', a search is carried out at the storage unit 7' to discriminate whether or not the storage unit 7' has previously stored the number equal to the received absolute number F, as described above. According to one aspect of the present invention, even when the absolute number exactly equal to the received absolute number F can not be found in the storage unit 7', if the first number and the second number are respectively equal to those in the received absolute number, and if the third numbers only differ, then, it is not necessary to transmit the whole of the picture data corresponding to the absolute number F. For example, when only the third number n in the absolute number stored in the storage unit 7' in the second station is smaller than the third number m in the absolute number F transmitted from the first station 1, the second station then requests the first station 1 to transfer picture data corresponding to the difference between the third numbers n and m. This transfer request is effected through a route comprising the absolute number supervising portion 21', the communication response control portion 22', and the transmitting portion 27'. In response to the transfer request, the control unit 6 in the first station 1 reads the differential picture data (the change data) corresponding to the difference from the storage unit 7 by means of the read control portion 25, and transmits the read data through the OR gate 20 and the transmitting portion 27 to the second station 1'.

During a conference between the second station 1' and a third station (not shown), when an addition or a correction is made to the picture data corresponding to the absolute number F, a new absolute number $F_1$ is provided to the added or corrected part of the new picture data. The difference between the original absolute number F and the new absolute number $F_1$ resides only in the third number m. That is, the new third number in the new absolute number $F_1$ is equal to (m+1). Assume that the first station did not join this conference between the second station 1' and the third station. Then, the first station does not have the new absolute number $F_1$. In this situation, when the original absolute number F is transmitted from the first station 1 to the second station 1', the second station 1' recognizes that the first station does not have the new absolute number $F_1$. The second station 1' then transmits to the first station 1 information telling the first station 1 that differential picture data will be transmitted from the second station 1' to the first station 1, through a route comprising the absolute number supervising portion 21', the communication response control portion 22', and the transmitting portion 27'. Simultaneously, the differential data corresponding to the new absolute number $F_1$ and stored in the storage unit 7' is transmitted through a route comprising the read control portion 25', the OR gate 20', and the transmitting portion 27', to the first station 1.

The above description with reference to FIG. 10 relates to the common mode of operation, in which the same picture is displayed on both the display units 4 and 4'. In the common mode of operation, new handwritten data input to either one of the stations can be superimposed on the picture data corresponding to the picture commonly displayed on both the display units 4 and 4', and new picture data obtained by this superimposing is supervised as new common picture data, as will be seen from the above description.

During a conference utilizing the thus commonly displayed picture, it may be necessary, in the first station 1 for example, to display another picture, which picture data exists in the storage unit 7, to investigate the picture at only the originating station 1. To this end, an operator inputs a command for switching to the individual mode and designates a second number of one of the existing picture data, from the keyboard unit 5. This results in a desired picture being displayed on the display unit 4, this picture being irrelevant to the picture being displayed on the display unit 4' at the second station 1'. In this individual mode at the first station 1, when the control units 6 and 6' are employed, the picture data of the picture being displayed on the display unit 6' is not transmitted to the first station 1.

However, even when one of the stations is in the individual mode, it is desirable that picture data for a picture for a common mode of operation should be stored at all of the stations. That is, when one of the stations is under the individual mode of operation, handwritten data formed in another station under a common mode of operation is preferably transmitted to the station under the individual mode and is automatically stored in that station's storage unit. The above-mentioned operation can be carried out according to another embodiment as illustrated in FIG. 11.

Figure 11:
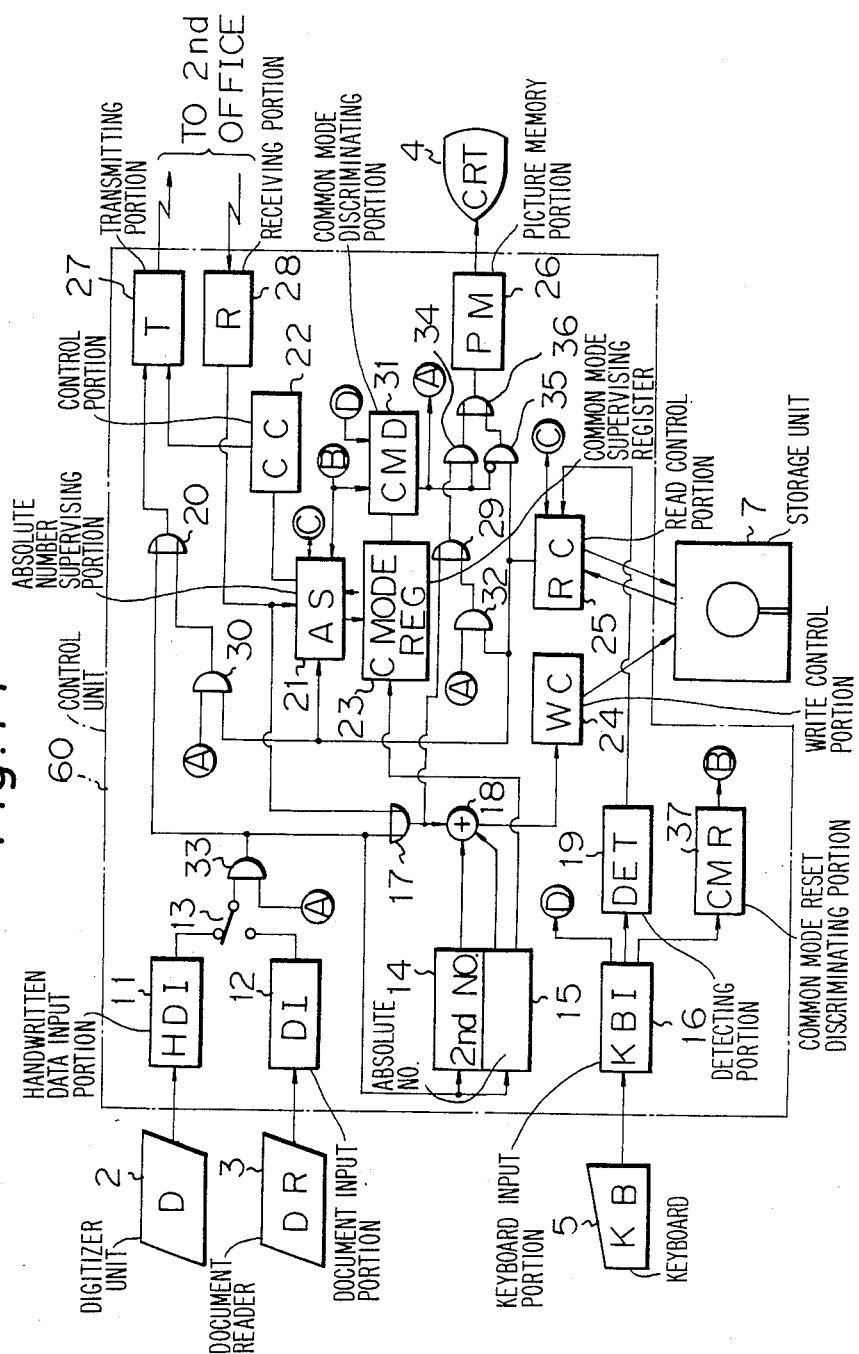
FIG. 11 is a block diagram illustrating another embodiment of the control unit in the system shown in FIG. 10.

FIG. 11 is a block diagram illustrating another embodiment of the control unit in the system shown in FIG. 8. The difference between the control unit 6 shown in FIG. 10 and the control unit 60 shown in FIG. 11 resides in that the control unit 60 further includes, in addition to the elements 11 through 29 in the control unit 6, an AND gate 30, a common mode discriminating portion (CMD)31, AND gates 32 through 35, an OR gate 36, and a common mode reset discriminating portion (CMR)37. The output Ⓐ of the common mode discriminating portion 31 is connected to one input of the AND gate 34, to an inverted input of the AND gate 35, to one input of the AND gate 30, to one input of the AND gate 32, and to one input of the AND gate 33. The keyboard input portion 16 has three outputs, the first being connected to the number detecting portion 19, the second being connected to the common mode reset discriminating portion 37, and the third being connected to one input of the common mode discriminating portion 31. The output Ⓑ of the common mode reset discriminating portion 37 is connected to the other input of the common mode discriminating portion 31 and to an input of the absolute number supervising portion 21. The output of the switch portion 13 is connected to the other input of the AND gate 33. The output of the read control portion 25 is connected to the other inputs of the AND gates 30, 32, and 35. The output of the AND gate 32 is connected to one input of the OR gate 29. The output of the OR gate 29 is connected to the other input of the AND gate 34. The outputs of the AND gates 34 and 35 are connected through the OR gate 36 to the picture memory portion 26. The output of the AND gate 33 is connected to one input of the OR gate 17, while the output of the receiving portion 28 is connected to the other input of the OR gate 17. The output of the AND gate 33 is also connected to one input of the OR gate 20, while the output of the AND gate 30 is connected to the other input of the OR gate 20.

The operation of the control unit 60' shown in FIG. 11 will now be described in detail.

Assume that the control units 6 and 6' in the electronic conference system shown in FIG. 8 are replaced by the control units 60 and 60' shown in FIG. 11.

The common mode of operation in the control unit 60' is similar to that in the control unit 6 described previously, and therefore, is not described here.

The common mode discriminating portion 31 controls the AND gates 30, 32, 33, 34, and 35 in response to the output Ⓓ of the keyboard input portion 16. The output Ⓓ is obtained when a "common mode setting command" or an "individual mode setting command" is input through the keyboard unit 5.

During a conference between the first station 1 and the second station 1' in a common mode of operation, when the individual mode of operation is required at, for example, the first station 1, an operator at the first station inputs the "individual mode setting command" through the keyboard unit 5. Then, through a route comprising the output Ⓓ of the keyboard unit 16 and the common mode discriminating portion 31, the output Ⓐ of the common mode discriminating portion 31 turns to a logical "0". Therefore, the AND gate 33 is turned off, so that any data input from the digitizer unit 2 or the document input portion 3 is inhibited from entering the control unit 60. The AND gate 34 is also turned off so that any picture data received through the receiving portion 28, the OR gate 17, and the OR gate 29 is inhibited from entering the picture memory portion 26. Whereas, the AND gate 35 having the inverted input is turned on.

The operator at the first station 1 then presses, for example, a function key such as "preceding page" or "next page" on the keyboard unit 5, to specify a desired second number corresponding to the picture to be displayed. The number detecting portion 19 detects the desired second number. Based on the detected number, the read control portion 28 accesses the picture data of the picture to be displayed. The picture data thus obtained is transferred through the AND gate 35 and the OR gate 36 to the picture memory portion 26. Thus, the desired picture, different from the picture being displayed at the second station 1' which is in the common mode of operation, can be displayed on the display unit 4. Since the AND gate 30, which receives the "0" at its one input, is closed, the picture data is not transmitted to the second station 1'.

A reset operation from the individual mode to the common mode is carried out as follows. The operator at the first station pushes a reset key on the keyboard unit 5. The keyboard input portion 16 discriminates the data from the keyboard unit 5 to provide a signal to the common mode reset discriminating portion 37, to establish a signal "1" at its output Ⓑ. When the common mode discriminating portion 31 receives the signal "1" from the output Ⓑ of the common mode reset discriminating portion 37, its output is turned from "0" to "1". Thus, the AND gates 30, 32, 33, and 34 are opened, and the AND gate 35 is closed. Also, the signal "1" from the output Ⓑ is applied to the absolute number supervising portion 21. In this state, the common mode of operation is carried out. In the common mode of operation, the picture data specified by the keyboard unit 5 is searched and displayed through a route comprising the read control portion 25, the AND gate 32, the OR gate 29, the AND gate 34, the OR gate 36, the picture memory 26, and the display unit 4. The picture data is also transmitted through the read control portion 25, the AND gate 30, the OR gate 20, and the transmitting portion 27 to the second station 1'. In addition, if the second number is not specified by the keyboard unit 5, the absolute number supervising portion 21 accesses, in response to the signal "1" from the output Ⓑ, the common mode supervising register 23 to read the absolute number corresponding to the common mode. Based on the read absolute number, the read control portion 25 reads the corresponding picture data from the storage unit 7. The read picture data is transferred through the AND gate 32, the OR gate 29, the AND gate 34, and the OR gate 36 to the picture memory portion 26. Thus, the picture in the common mode is displayed on the display unit 4.

During an individual mode of operation in the first station 1, when picture data is transmitted from the second station 1' which is operating in a common mode of operation, the picture data from the second station 1' is stored and added to existing picture data for a common mode in the storage unit 7 through a route comprising the receiving portion 28, the OR gate 17, the number adding portion 18, and the write control portion 24. Since the AND gate 34 is closed during the individual mode of operation, the picture data transmitted from the second station 1' has no influence on the picture being displayed in the individual mode. Thus, even during an individual mode of operation, existing picture data for a common mode can be corrected in the storage unit 7. Therefore, when the first station 1 is reset from the individual mode to the common mode, the picture displayed on the display unit 4 is the corrected picture, i.e., the same picture as displayed at the second station 1'.

FIG. 12 shows the data structure of the storage unit according to an embodiment of the present invention. In FIG. 12, the storage unit 7 has an identification number storing area 71, a location number storing area 72, an absolute number storing area 73, and a picture data storing area 74. The identification number storing area 71 stores an identification number ID which is given to the individual storage unit 7 for identification. When the storage unit 7 is replaced by another storage unit, e.g., the floppy disk is changed for a new one, the identification number is also changed.

The location number storing area 72 stores the location records LR. Each location record LR consists of a location number L and a first pointer $P_1$. In each location record LR, there may be additional first pointers $P_1'$, $P_2'$, ... when corrections or additions are made to the original picture data corresponding to the location number L.

The absolute number supervising area 73 stores the absolute number records AR. Each absolute number record AR consists of an absolute number $A_b$ and a second pointer $P_2$. Each of the absolute numbers consists of a first number N, a second number M, and a third number n, as described previously. When an addition or correction is made to the existing picture data corresponding to the absolute number $NM_n$, a new absolute number record is formed for the added or corrected part of the picture data. The new absolute number record has a new absolute number $NM(n+1)$ and a new second pointer $P_2'$, as illustrated in FIG. 12. When the new picture data is further corrected, a further new absolute number record having a further new absolute number $NM(n+2)$ and a further new second pointer $P_2''$ is formed.

The picture data storing area 74 stores picture data corresponding to a number of pictures, respectively.

Each of the first pointers $P_1$, $P_1'$, $P_2'$, ... indicates an address, for example, the start address, of an absolute number record AR. Similarly, each of the second pointers $P_2$, $P_2'$, $P_2''$, ... indicates an address, for example, the start address, of picture data.

In operation, when the location number L is designated, absolute number records pointed to by the first pointers $P_1$, $P_1'$, $P_1''$, ... are searched for and the picture data pointed to by the second pointers $P_2$, $P_2'$, $P_2''$, ... are fetched. Thus, the picture designated by the location number L is displayed.

If no correction has been made to the picture corresponding to the location number L, a single absolute number record pointed to by the first pointer $P_1$ is searched for and a single unit of picture data pointed to by the second pointer $P_2$ is fetched.

For a location number which has no corresponding absolute number, that is, for a vacant location, the corresponding first pointer $P_1$ is assumed to have a value "0".

FIGS. 13A and 13B combined comprise a flowchart illustrating a sequence of processes when new picture data is formed according to an embodiment of the present invention. In FIGS. 13A and 13B, the identification number ID equal to the number, for example, $N_1$, is assigned to the identification number storing area 71 of the storage unit 7 in step S1 and stored therein.

In step S2, a vacant location number L corresponding to a first pointer $P_1$ having a value "0" is searched in the location number storing portion 72 of the storage unit 7. Assume that the searched vacant location number is equal to $M_1$.

In the step S3, a discrimination is carried out to determine whether an entry for forming the new picture data is started or originates at the first station 1 or at the second station 1'. If the entry is originated at the first station 1 by means of the digitizer unit 2 or the document reader 3, then, in the fourth step S4, the absolute number corresponding to the new picture data is determined or assigned as $N_1M_11$. In the absolute number $N_1M_11$, the first number $N_1$ indicates that the new picture data is to be originally stored in the storage unit 7, the second number $M_1$ indicates that the new picture data is to be stored in an area specified by the location number $M_1$ in a storage unit, and the third number 1 indicates the number of editions is equal to 1, i.e., no addition or correction has been made to the new picture data.

In step S5, the second station 1' is informed of or receives the determined absolute number $N_1M_11$.

In step S6, a search is made for a vacant area in the absolute number storing area 73.

In step S7, a first pointer $P_1$ indicating the start address, for example, of the vacant area found in step S6 is set or stored in the location number record having the location number $M_1$.

In step S8, a search is made for a vacant area in the picture data area 74.

In step S9, a second pointer $P_2$ indicating the start address, for example, of the vacant area in the picture data area found in step S8 is set or loaded in the absolute number record having the absolute number $N_1M_11$.

Finally, in step S10, the new picture data is recorded in the area of the picture data area 74 indicated by the second pointer $P_2$.

In step S3, if the entry for forming the new picture is not started or originated at the first station 1, then, in step S11, a discrimination is carried out to determine whether or not the entry originated at the second station 1'.

If the entry is started by the second station 1' then, in step S12, the second station 1' informs or transmits the first station 1 an absolute number of, for example, $N_2M_21$ formed in the second station 1'. In the absolute number $N_2M_21$, the first number $N_2$ indicates that the new picture data is originally stored in the storage unit 7' having the identification number $N_2$, the second number $M_2$ indicates that the new picture data is stored in the location number $M_2$ in a storage unit and the third number 1 indicates the number of editions is equal to 1.

In step S13, a search is made for a vacant area in the absolute number storing area 73.

In step S14, a first pointer $P_1$ is set or loaded in a similar way as in step S7.

In step S15, a search is made for a vacant area in the picture data area 74.

In step S16, a second pointer $P_2$ is set or loaded in a similar way as in step S9.

After step S16, step S10 is carried out.

Figure 14:
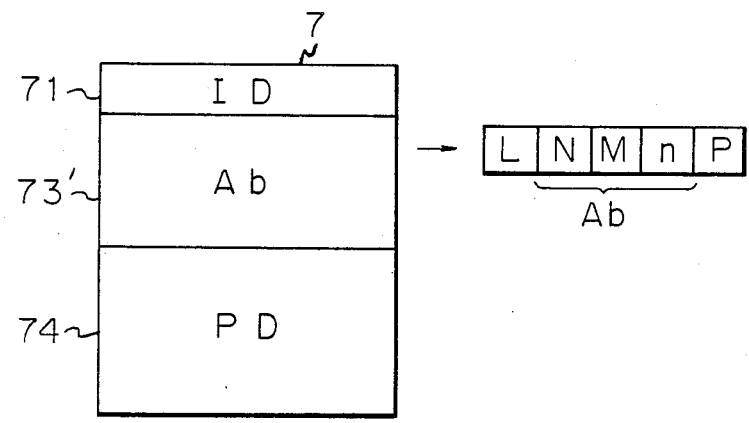
FIG. 14 is a diagram of the structure of the storage unit according to another embodiment of the present invention.

FIG. 14 shows the data structure of the storage unit according to another embodiment of the present invention. In FIG. 14, different from FIG. 12, the storage unit 7 does not have the location number storing area 72. Instead, the absolute number storing area 73' stores the absolute number records, each consisting of a location number L, an absolute number $A_b$, and a pointer for indicating the address of the picture data corresponding to the absolute number $A_b$. When additions or corrections are made to an existing picture data, the numbers of pointers may be increased. The structure shown in FIG. 14 can also store picture data provided with an absolute number.

Figure 15:
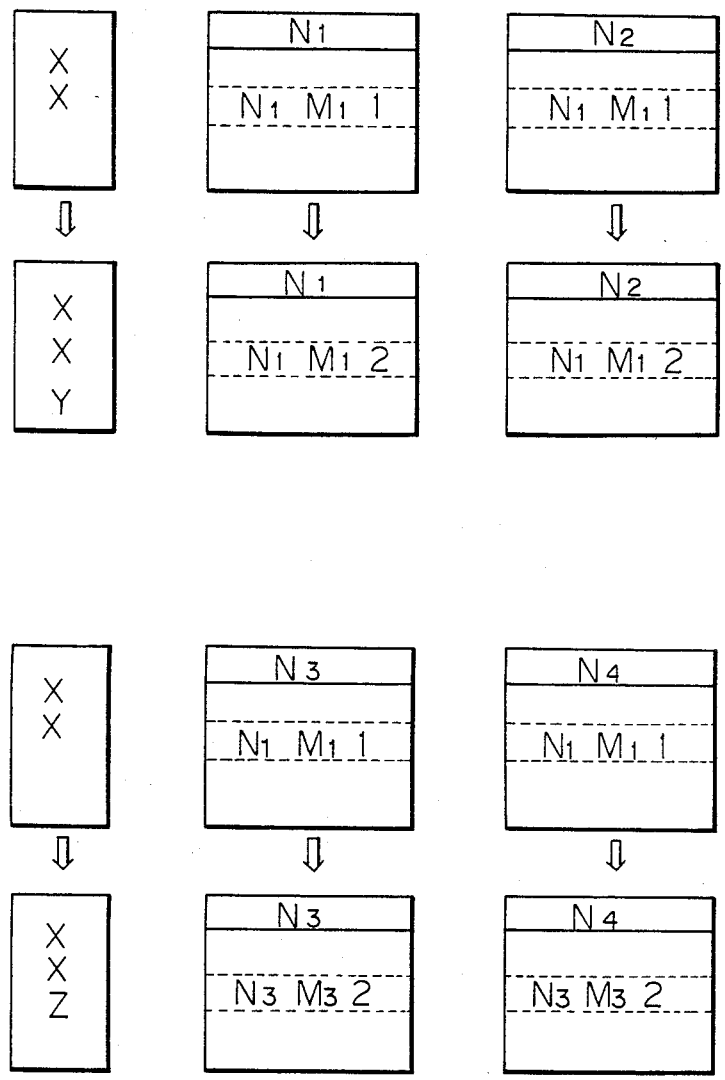
FIG. 15 is a diagram illustrating four storage units, to explain a problem when additions or corrections are effected on original data.

FIG. 15 is a diagram illustrating four storage units, to explain a problem arising when additions or corrections are made to original picture data. In FIG. 15, the four storage units have identification numbers $N_1$, $N_2$, $N_3$ and $N_4$, respectively. All of the storage units originally store the same picture data provided with an absolute number $N_1M_11$. The picture data corresponding to the absolute number $N_1M_11$ corresponds to a picture XX. Assume that the picture data stored in the storage units having the identification numbers $N_1$ and $N_2$ is corrected, in order to display a new picture XXY as illustrated in the upper portion of FIG. 15, then a new absolute number $N_1M_12$ is stored in these storage units having the identification numbers $N_1$ and $N_2$. Note, the third number is revised to 2. Also, assume that the picture data stored in the storage units having the identification numbers $N_3$ and $N_4$ is corrected, in order to display a new picture XXZ which is different from the picture XXY, then, if the same absolute number $N_1M_12$ for the picture XXY is also stored in these storage units having the identification numbers $N_3$ and $N_4$, there is an unexpected result in that the new absolute number $N_1M_12$ corresponds to different pictures XXY and XXZ.

Accordingly, as illustrated in the lower portion of FIG. 15, another new absolute number of, for example, $N_3M_32$, which is different from the absolute number $N_1M_12$, must be stored in the storage units having the identification numbers $N_3$ and $N_4$.

Figure 16A:
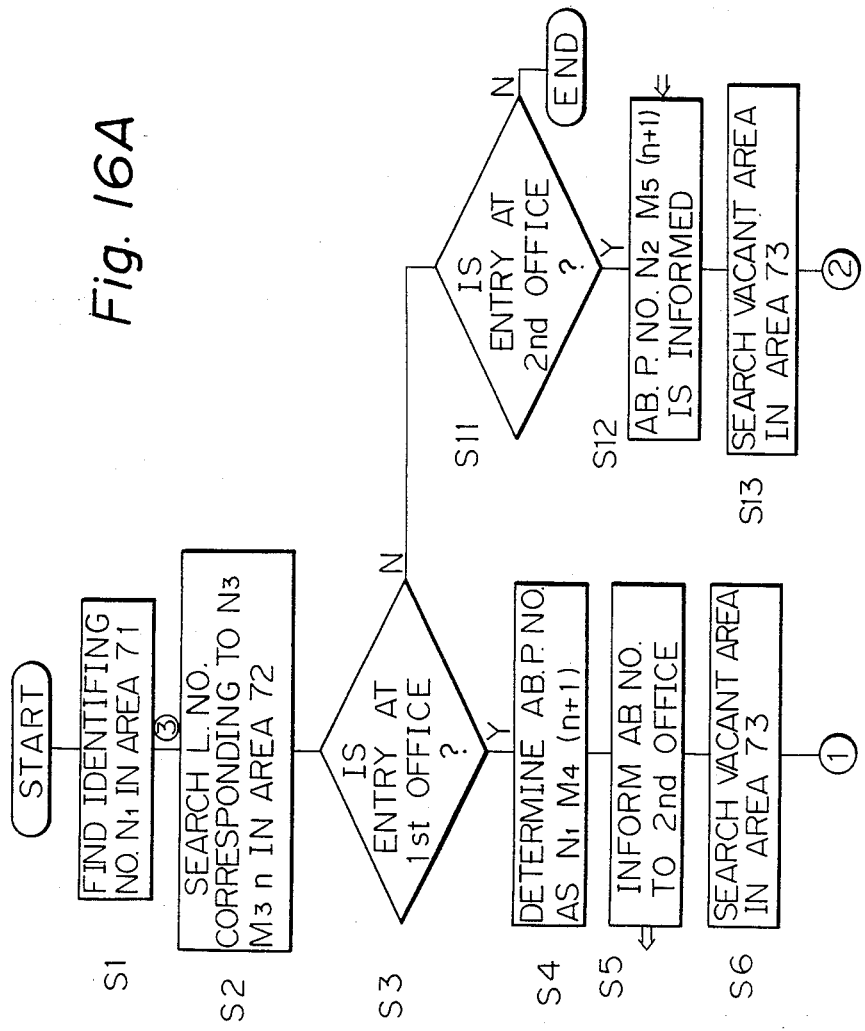

FIGS. 16A and 16B combined from a flowchart illustrating a sequence of processes when an addition or correction is made to existing picture data. In FIGS. 16A and 16B, it is assumed that a picture being displayed corresponds to absolute numbers $N_3M_31$ through $N_3M_3n$. Also, a correction is assumed to be made in the storage unit 7 having an identification number $N_1$.

In step S1, the identification number $N_1$ is found in the identification number storing area 71.

In step S2, a location number corresponding to the absolute number $N_3M_3n$ is searched for in the location number storing area 72. The searched for location number is assumed to be $M_4$.

In step S3, a discrimination is carried out to determine whether an entry for making an addition or correction is started or originated at the first station 1 or at the second station 1'.

If the addition or the correction is produced at the first station 1, then, in step S4, the absolute number corresponding to the added or corrected part of the picture data is determined as $N_1M_4(n+1)$ which is different from the absolute number $N_3M_3(n+1)$, for the same reason as mentioned with reference to FIG. 15. In the absolute number $N_1M_4(n+1)$, the first number $N_1$ indicates that the added or corrected part of the picture data is written into the storage unit 7 having the identification number $N_1$, the second number $M_4$ indicates that the entry is effected in the area specified by the location number $M_4$, and the third number $(n+1)$ indicates that the added or corrected part has the edition number 1, in comparison with the original picture data having the third number n.

Steps S4 through S13 are similar to steps S4 through S13 in FIGS. 13A and 13B except that, in FIGS. 16A and 16B, the absolute number formed in the first station is $N_1M_4(n+1)$ and the absolute number received from the second station 1' is $N_2M_5(n+1)$.

Figure 17:
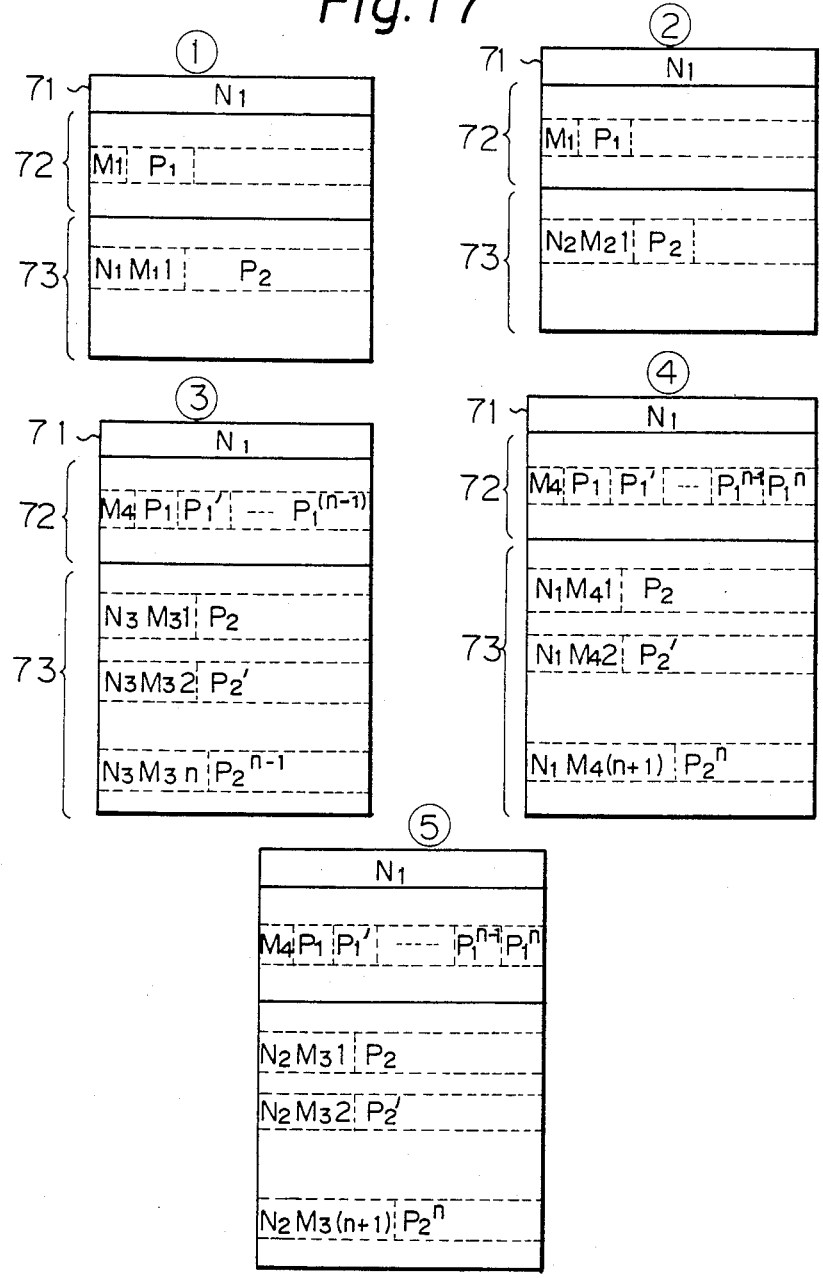
FIG. 17 shows respective states of the storage unit 7 during the processes shown in FIGS. 13A, 13B, 16A, and 16B.

FIG. 17 shows respective states of the storage unit 7 in the processes shown in FIGS. 13A, 13B, 16A, and 16B. In FIG. 17, ① shows the state after step S9 in FIG. 13B; ② shows the state after step S16 in FIG. 13B; ③ shows the state after step S1 in FIG. 16A; ④ shows the state after step S9 in FIG. 16B; and ⑤ shows the step after step S16 in FIG. 16B. For example, ① shows that the identification number $N_1$ is stored in the identification number storing area, a first pointer $P_1$ for specifing the absolute number $N_1M_11$ is stored in the location number record including the location number $M_1$ in the location number storing area 72, and a second pointer $P_2$ for specifying the picture data corresponding to the absolute number $N_1M_11$ is stored in the absolute number record including the absolute number $N_1M_11$.

State ② is similar to state ① and, therefore, is not described here.

State ③ that there must be additional first pointers $P_1'$, ..., and $P_1^{(N-1)}$ for pointing the absolute numbers $N_3M_32$ through $N_3M_3n$. Also, there must be additional second pointers $P_2'$, ..., $P_2^{(N-1)}$ for pointing to the picture data. This means that the number of additions or corrections on the picture corresponding to the original absolute number $M_3M_31$ is $n-1$. The other states ③ through ⑤ can be understood by analogy with upon comprehension of the state ①.

Figure 18:
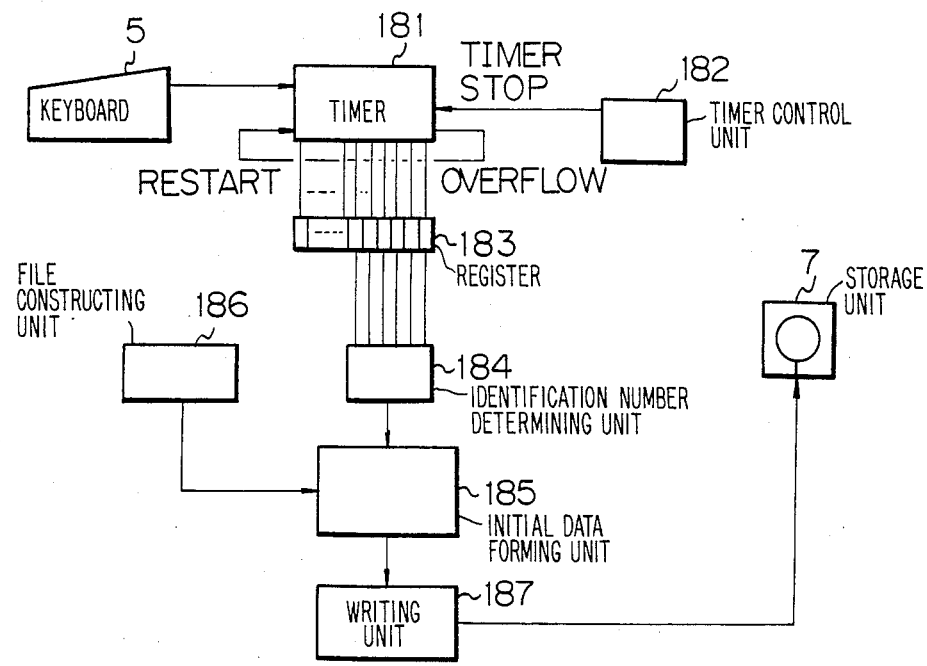
FIG. 18 is a block diagram illustrating the composition of an identification number determining system according to an embodiment of the present invention.

FIG. 18 is a block diagram illustrating the composition of an identification number determining system according to an embodiment of the present invention. In the figure, 5 is the keyboard unit, 7 is the storage unit (for example, a floppy disk), 181 is a timer, 182 is a timer control unit, 183 is a register, 184 is an identification number determining unit, 185 is an initial data forming unit, 186 is a file constituting unit, and 187 is a writing unit for the storage unit. In this example, an identification number for the storage unit 7 is assigned by using the initialization of the storage unit 7 when an operating program is stored into the storage unit 7.

That is, in response to a turning on of a power supply of the keyboard unit 5 by a manual operation, the timer 181 starts to count with a predetermined clock signal. After the timer counts to a predetermined number, it overflows to provide an overflow carrier, whereby the timer is restarted to repeat the count from zero. When the timer control unit 182 detects that the storage unit 7, for example, a floppy disk, has been mounted manually, the timer control unit 182 outputs a signal to stop the counting operation of the timer 181 and to make the counter 181 output its contents. Thus, the contents of the counter 181, which represent the period between the turning on of the timer 5 and the mounting of the disk into storage unit 7, are written into the register 183. A predetermined number of lower significant bits in the register 183 are output to the identification number determining unit 184. The identification number determining unit 184 then sets the input value from the register 183 as an identification number for the storage unit 7.

It should be noted that the time necessary for manually mounting a disk in a storage unit is usually different from that for manually mounting a disk in another storage unit, at least by an order of microseconds. Therefore, the lower significant bits in the register 183 can be used as an identification number for a storage unit.

The thus determined identification number, for example, $N_1$ is transferred to the initial data forming unit 185. The file constituting unit 186 stores data necessary for initializing the storage unit 7 such as the operating program, which is a part of an operating system and of an application program for making the storage unit 7 to be practically usable. The initial data forming unit 185 forms initial data including the data from the file constituting unit 186 and the identification number from the identification number storing unit 184. The initial data is output to the writing unit 187. The writing unit 187 initializes the storage unit 7 by using the initial data from the initial data forming unit 185.

Thus, the identification number for a storage unit is determined by using a timer for repeatedly counting a predetermined number, the timer being started manually in response to, for example, a turning on of a power supply, and the timer being stopped manually in response to the mounting of a disk in the storage unit. A predetermined number of lower bits of the value counted by the timer are extracted to be used as an identification number for the storage unit, whereby individual identification numbers are provided to individual storage units.

The above-mentioned embodiment for providing an identification number to a storage unit is an example. As long as the uniqueness of respective identification numbers can be assured, any device for providing identification numbers may be employed.

Figure 19:
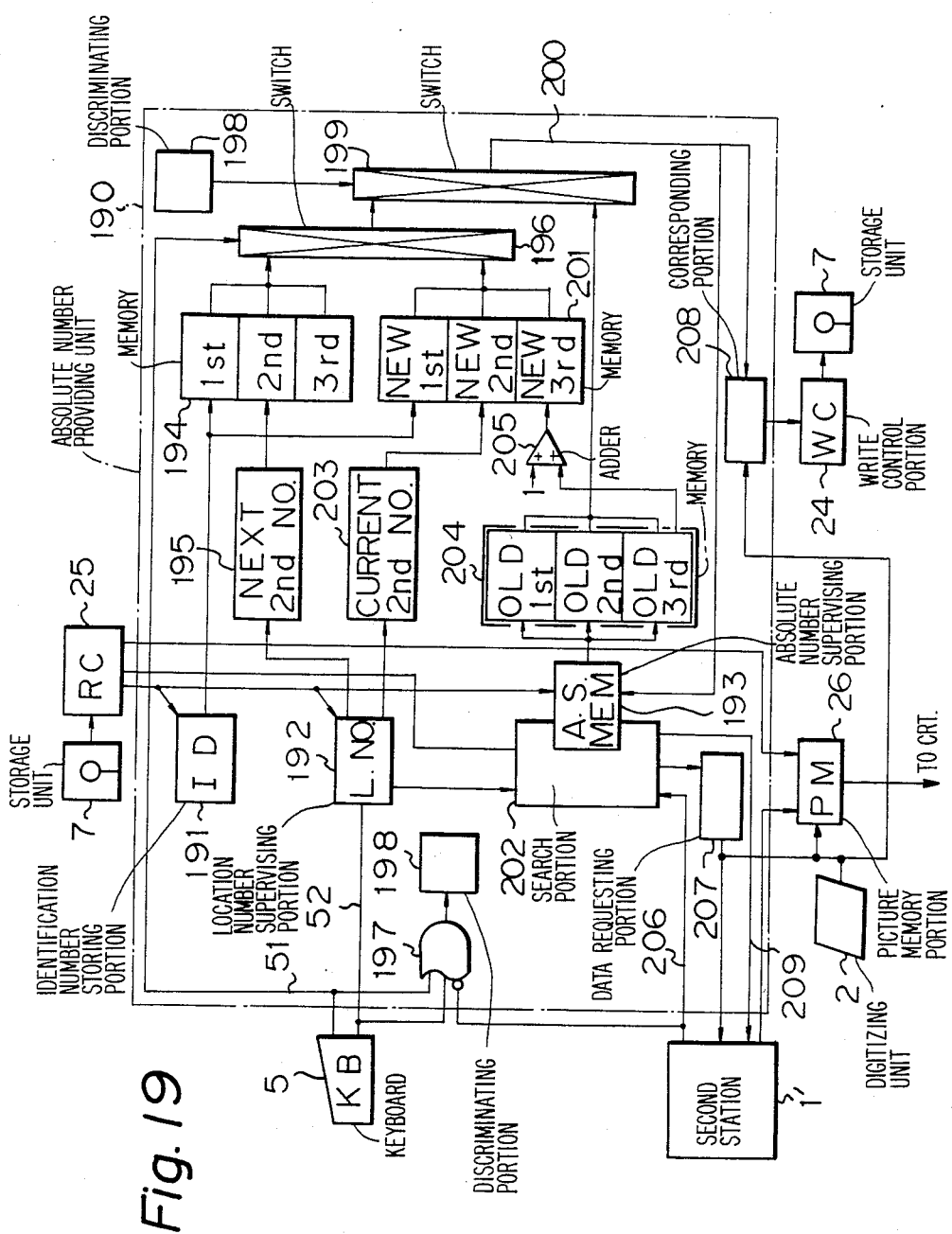
FIG. 19 is a block diagram illustrating an absolute number providing unit according to an embodiment of the present invention.

FIG. 19 is a block diagram illustrating an absolute number providing unit according to an embodiment of the present invention. Particularly, the absolute number providing unit 190 shown in FIG. 19 corresponds to an embodiment of the second number numbering portion 14, the absolute number numbering portion 15, the number adding portion 18, the absolute number supervising portion 21, the communication response control portion 22, and the common mode supervising register 23, shown in FIGS. 10 and 11. In FIG. 19, the digitizer unit 2, the keyboard unit 5, the write control portion 24, the read control portion 25, and the picture memory portion 26 are the same as those shown in FIGS. 10 and 11. Reference numeral 7 represents a storage unit which is the same as the storage unit 7 shown in FIGS. 10 and 11. The absolute number providing unit 190 shown in FIG. 19 comprises an identification number storing portion (ID) 191, a location number supervising portion (L.NO) 192, an absolute number supervising memory (A.S. MEM) 193, an absolute number memory 194, a next second number forming portion 195, a first switch 196, a gate 197, a discriminating portion 198 for discriminating whether the entry is started at the first station 1 or the second station 1', a second switch 199, an output line 200 for conveying an absolute number, a new absolute number memory 201, a search portion 202, a current second number storing portion 203, an old absolute number memory 204, an adder 205, a signal line 206 from the second station 1', a data requesting portion 207, a corresponding portion 208, and an information line 209 to the second station 1'.

In FIG. 19, the read control portion 25 reads the identification number of the storage unit 7 to store it in the identification number storing portion 191. The portion 25 also reads all of the location numbers corresponding, respectively, to picture data of pictures stored in the storage unit 71, and stores them in the location number supervising portion 192 and in the absolute number supervising memory 193. Further, the read control portion 25 reads all of the absolute numbers stored in the storage unit 7 to store them in the absolute number supervising memory 193. Thus, the absolute number supervising memory 193 stores the location numbers L and absolute numbers $A_b$ respectively corresponding to the location numbers L, each of the absolute numbers consisting of a first number, a second number, and a third number, in the form of a table as shown in FIG. 20.

The operation of the absolute number providing unit 190 is described in the following three modes I, II, and III.

I: In forming a new picture, the corresponding absolute number to be stored in the absolute number memory 194 is determined as follows.

(1) By manually operating the keyboard unit 5, an instruction to form a new picture is provided so that its first output 51 becomes a logic "1".

(2) The identification number stored in the identification number storing portion 191, i.e., the identification number corresponding to the storage unit 7 being used, is set or loaded into a first number storing portion in the absolute number memory 194.

(3) A vacant location is searched for in the location number supervising portion 192. When a vacant location is found, its corresponding location number is transferred to the next second number forming portion 195, which then sets or loads a second number equal to the location number into a second number storing portion in the absolute number memory 194.

(4) A third number equal to "1" is set or loaded in a third number storing portion in the absolute number memory 194. Thus, the new absolute number is formed in the absolute number memory 194.

(5) In response to the first output 51 of the keyboard unit 5, the first switch 196 selects the output of the absolute number memory 194.

(6) In response to the first output 51 of the keyboard unit 5, the output of the gate 197 provides a logic "1" to the discriminating portion 198, whereby the output of the descriminating portion 198 is kept at a logic "1" indicating that the entry for forming a new picture is effected at the first station 1.

(7) In response to the first output 51 of the discriminating portion 198, the second switch 199 selects the output of the first switch 196.

(8) By drawing a new picture on the digitizer unit 2, new picture data is stored in the picture memory portion 26. As a result, the absolute number stored in the absolute number memory 194 is obtained on the output line 200, and the corresponding picture data is stored in the picture memory portion 26.

II. In updating an existing picture in the first station 1, the corresponding new absolute number is determined as follows.

(1) By manually operating the keyboard unit 5, the second number corresponding to the picture to be corrected is specified, whereby (2) the specified second number is sent through a second output line 52 to the location number supervising portion 192. In response to the received second number, the location number supervising portion 192 requires the search portion 202 to search for the absolute number in the memory 193 having a second number equal to the received second number. Also, the location number supervising portion 192 transmits the specified second number to the current second number storing portion 203.

(3) The search portion 202 searches, in the absolute number supervising memory 193, for the absolute number corresponding to the received second number. When the absolute number is found, the search portion 202 sends the found absolute number to the read control portion 25. The read control portion 25 then reads out picture data corresponding to the received absolute number, and the read picture data is supplied to the picture memory portion 26 wherein the picture data is developed for displaying the specified picture. The absolute number found by the search portion 202 is also sent to the old absolute number memory 204 and, through the information line 209, to the second station 1'.

(4) The identification number in the identification number storing portion 191 is stored in the new first number storing portion of the new absolute number memory 201, and the specified second number stored in the current second number storing portion 203 is stored in the new second number storing portion. One is added to the third number stored in the old absolute number memory 204, by the adding portion 205. The output of the adding portion 205 is supplied to the third number storing portion in the new absolute number storing portion 201.

(5) In response to the first output 51 of the keyboard unit 5, the first switch 196 selects the output from the new absolute number storing portion 201.

(6) In response to the manual operation of the keyboard unit 5 for correcting the picture, the output of the discriminating portion 198 is kept at a logic "1". Accordingly, as for the previously described case when a new picture is to be formed, the second switch 199 selects the output of the first switch 196.

(7) By making an addition or correction to the picture being displayed, by means of the digitizer unit 2, the added or corrected part of the picture data is stored in the picture memory portion 26. As a result, the new absolute number stored in the new absolute number memory 201 is obtained on the output line 200, and the added or corrected part of the picture data is stored in the picture memory portion 26. III. When an absolute number is sent from the second station 1' to the first station 1, the operation of the absolute number providing unit 190 is as follows.

(1) The signal from the second station 1' is applied through the gate 197 to the discriminating portion 198 so that its output is kept at a logic "0", indicating that an absolute number is received from the second station 1'.

(2) The signal from the second station 1' includes an absolute number, which is applied through the signal line 206 to the search portion 202. The search portion 206 searches, in the absolute number supervising memory 193, for the absolute number equal to the received absolute number. When the absolute number is not found in the absolute number supervising memory 193, the search portion 202 provides a signal to the data requiring portion 207 so that the data requiring portion 207 sends a request for picture data to the second station 1'. In response to the request from the data requiring portion 202, the second station 1' transmits the picture data, which is received and stored by the picture memory portion 26. When the absolute number is found in the absolute number supervising memory 193, the picture data corresponding to the found absolute number is read from the storage unit 7 by the read control portion 25, and is transferred to the picture memory portion 26.

(3) The absolute number transmitted from the second station 1' is set into the old absolute number memory 204.

(4) In response to the logic "0" at the output of the discriminating portion 198, the second switch selects the output of the old absolute number memory 204. As a result, the absolute number sent from the second station 1' is obtained on the output line 200, and the corresponding picture data is stored in the picture memory portion 26.

Consequently, as will be seen from the above description of the three stages I, II, and III, the picture data corresponding to the picture to be displayed is stored in the picture memory portion 26, and the corresponding new absolute number is output on the output line 200.

In the corresponding portion 208, the picture data developed by the picture memory portion 26 and the absolute number on the output line 200 are combined and, through the write control portion 24, the combined data is written into the storage unit 7. The new absolute number obtained on the output line 200 is written into the absolute number supervising memory 193.

From the foregoing description, it will be apparent that, according to the present invention, an improved electronic conference system can be obtained, in which, when the same picture data is stored in respective stations remote from each other, the same picture can be simultaneously displayed at the different stations without further transmitting the same picture data from one station to another.

Further, when a correction or an addition is made to the same picture data at one station, only the corrected or added part of the picture data is transmitted from the originating station to the other stations, without transmitting all of the original picture data.

Still further, each office is able to select one of two modes, i.e., a common mode and an individual mode.

Still further, an identification number for a storage unit can be easily assigned.

As a result, the transmission capacity of a transmission line between remote stations can be reduced, and the data transmission speed on the transmission line can be increased, along with an improved simple supervision and control of the picture data.

The present invention is not restricted to the described embodiments. Various changes and modifications are posible without departing from the spirit of the present invention.

We claim:

1. An electronic conference system for a remote conference among a plurality of stations each displaying the same picture data, each of said stations comprising:
   a data input unit for inputting the picture data;
   a storage unit for storing picture data for plural pictures;
   a display unit for displaying each of said pictures one at a time; and
   control means connected to said data input unit, said storage unit and said display unit, for controlling the storing of picture data input from said data input unit in a first station or transferred from a second station, for controlling a display on said display unit, for controlling transmitting of picture data stored in said storage unit to said second station, and for controlling receiving of picture data transferred from said second station, each of said control means comprising:
   absolute number providing means for assigning a first absolute number to picture data when said picture data of said picture is input from said data input unit of the first station, said storage unit storing said first absolute number;
   absolute number transmitting means for transmitting said first absolute number to said second station;
   picture data transmitting means for transmitting said picture data provided with said first absolute number to said second station only when said second station stores no number equal to said first absolute number;
   absolute number receiving means for receiving a second absolute number from said second station when picture data is formed in said second station, said storage unit storing said second absolute number;
   discriminating means for discriminating whether said storage unit stores a number equal to said second absolute number from said second station;
   discriminating result transmitting means for transmitting result information concerning the discrimination by said discriminating means to said second station; and
   picture data receiving means for receiving picture data provided, from said second station, with said second absolute number, said second station transmitting said picture data with said second absolute number in response to the result information received from said discriminating result transmitting means, said result information indicating that said storage unit has not stored the number equal to said second absolute number;
   whereby, the same picture data for the same pictures stored in respective storage units in respective stations is supervised by the same absolute number at connected stations.

2. An electronic conference system as set forth in claim 1, wherein said control means in each station further comprises:
   write control means for writing an absolute number, provided in said first station or transferred from said second station, into said storage unit in said first station;
   absolute number specifying means for specifying an absolute number corresponding to a picture to be displayed; and
   read control means for reading out picture data of a picture to be displayed, by searching for an address of said picture data in said storage unit, said address corresponding to said absolute number specified by said absolute number specifying means.

3. An electronic conference system as set forth in claim 2, wherein said storage unit in each of said stations comprises a first area for storing said absolute numbers, and a second area for storing said picture data of said plural pictures corresponding to said absolute numbers in a one by one correspondence, each of said absolute numbers comprising a first number for identifying the storage unit in which said absolute number is originally stored, and a second number for specifying the address in said storage unit of the picture data of the picture to be displayed.

4. An electronic conference system as set forth in claim 3, wherein each of said absolute numbers further comprises a third number, said third number representing the number of editions of the picture corresponding to the absolute number including said third number.

5. An electronic conference system as set forth in claim 4, wherein, when an addition is made, by means of said data input unit, to a picture being displayed at said one station, said absolute number providing means forms a new absolute number corresponding to the added part of the new picture data.

6. An electronic conference system as set forth in claim 5, wherein said absolute number transmitting means transmits said new absolute number to said another station, and said picture data transmitting means transmits said added part of the new picture data to said another station.

7. An electronic conference system as set forth in claim 6 further comprising switching means for switching the operation of said first station between a common mode of operation for displaying, in said first station, a picture which is the same as the picture displayed in said another station when said another station is in said common mode of operation, and an individual mode of operation for displaying, in said one station, a picture corresponding to an absolute number specified, independently from said another station, by said absolute number specifying means in said one station.

8. An electronic conference system as set forth in claim 3, wherein said storage unit stores a plurality of location numbers, each of said absolute numbers stored in said storage unit corresponding to one of said location numbers, and, by sepecifying a desired one of said location numbers in said absolute number specifying means, a desired picture is displayed in accordance with control by said control means.

9. An electronic conference system as set forth in claim 5, wherein said storage unit stores a plurality of location numbers, each of said location numbers corresponding to one group of absolute numbers having the same first and second numbers and different third numbers, and by specifying a desired one of said location numbers in said absolute number specifying means, a desired picture including additions or corrections is displayed in accordance with control by said control means.

10. An electonic conference system as set forth in claim 3, further comprising first number determining means for determining said first number for identifying a storage unit and including initialization means for initializing said storage unit, said first number being determined based on the time necessary for the initialization.

11. An electronic conference system as set forth in claim 10, wherein the time is represented by binary bits and said first number is determined based on predetermined lower order bits obtained from the time necessary for the initialization.

12. A electronic conference system station connected to a remote station, said system station comprising:
   input means for inputting picture data;
   storage means for storing the picture data;
   display means for displaying pictures associated with the picture data;
   supervisory means for coordinating the input picture data by assigning to the picture data an indicator indicating at which station the picture data was input or originally stored; and
   update transmitting means for transmitting only picture changes and an updated indicator.

13. A method of coordinating picture data input at and used by a plurality of remote stations, comprising the steps of:
   (a) assigning to the input picture data an indicator indicating at which station the picture data was input or originally stored;
   (b) transmitting the indicator to the remote stations;
   (c) assigning to the updated input picture data an updated indicator; and
   (d) transmitting only the updated input picture data and the updated station indicator to the remote stations.

14. A method as set forth in claim 13, further comprising the step of:
   (e) requesting picture data from the station associated with the indicator when the station requesting is to display the requested picture data and the station requesting has not received the requested picture data.

* * * * *